US012282964B2

(12) United States Patent
Gutsell et al.

(10) Patent No.: US 12,282,964 B2
(45) Date of Patent: Apr. 22, 2025

(54) HUB FOR AUTOMATED RECOVERY AFTER A CRITICAL EVENT IN SHARED MOBILITY SERVICES

(71) Applicant: Allstate Insurance Company, Northbrook, IL (US)

(72) Inventors: Christopher Paul Gutsell, Gurnee, IL (US); Connor Walsh, Lake Forest, IL (US); John P. Kelsh, Antioch, IL (US); Rebecca Harasymczuk, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 142 days.

(21) Appl. No.: 17/947,940

(22) Filed: Sep. 19, 2022

(65) Prior Publication Data

US 2023/0013317 A1    Jan. 19, 2023

Related U.S. Application Data

(63) Continuation of application No. 16/739,429, filed on Jan. 10, 2020, now Pat. No. 11,449,946.
(Continued)

(51) Int. Cl.
*G06Q 40/08* (2012.01)
*G06F 40/205* (2020.01)
(Continued)

(52) U.S. Cl.
CPC ........... *G06Q 40/08* (2013.01); *G06F 40/205* (2020.01); *G06N 20/00* (2019.01); *H04N 7/183* (2013.01)

(58) Field of Classification Search
CPC ..................................................... G06Q 40/08
See application file for complete search history.

(56) References Cited

U.S. PATENT DOCUMENTS 10,460,534 B1 * 10/2019 Brandmaier ........... G07C 5/008
11,127,082 B1 *  9/2021 Gore ...................... G06Q 40/08
(Continued)

FOREIGN PATENT DOCUMENTS

WO    WO-2018057497 A1 *  3/2018    ......... G06Q 30/0283

OTHER PUBLICATIONS

Notice of Allowability on U.S. Appl. No. 16/739,429, filed Aug. 23, 2022, 5 pages.

(Continued)

*Primary Examiner* — Edward Chang
(74) *Attorney, Agent, or Firm* — Akerman LLP

(57) ABSTRACT

Systems and methods are disclosed for using a hub to automate recovery. One method may include, receiving, a notification of a critical event, first vehicle information of a first vehicle associated with the critical event, and second vehicle information of a second vehicle associated with the critical event; receiving, first damage information related to the critical event; analyzing, the second vehicle information to identify the second vehicle; determining, a second user device associated with the second vehicle; establishing, communication with the second user device; transmitting to the second user device, a request for input wherein the input is second damage information related to the critical event; receiving, the second damage information; comparing the first damage information to the second damage information; generating, a response certainty score based on the comparison; determining, that the response certainty score satisfies a confidence value threshold; and determining, a fault assessment for the critical event.

12 Claims, 6 Drawing Sheets

Related U.S. Application Data

(60) Provisional application No. 62/792,847, filed on Jan. 15, 2019, provisional application No. 62/790,725, filed on Jan. 10, 2019.

(51) Int. Cl.
*G06N 20/00* (2019.01)
*H04N 7/18* (2006.01)

(56) References Cited

U.S. PATENT DOCUMENTS

2017/0053461 A1  2/2017  Pal et al.
2019/0244301 A1  8/2019  Seth et al.

OTHER PUBLICATIONS

Notice of Allowance on U.S. Appl. No. 16/739,429, filed May 5, 2022, 8 pages.
Office Action on U.S. Appl. No. 16/739,429, filed Jan. 6, 2022, 20 pages.

\* cited by examiner

HUB FOR AUTOMATED RECOVERY AFTER A CRITICAL EVENT IN SHARED MOBILITY SERVICES

CROSS-REFERENCE TO RELATED APPLICATIONS

This application is a continuation of U.S. patent application Ser. No. 16/739,429, filed Jan. 10, 2020, which claims priority to U.S. Provisional Patent App. No. 62/792,847, filed Jan. 15, 2019, and to U.S. Provisional Patent App. No. 62/790,725, filed Jan. 10, 2019. The contents of these applications are incorporated herein in their entireties by reference.

TECHNICAL FIELD

Aspects of the disclosure generally relate to shared mobility applications. In particular, various aspects of the disclosure include a framework for automating recovery after a critical event in shared mobility service.

BACKGROUND

In the shared mobility industry, accidents can be a persistent problem. Drivers operating a vehicle for a shared mobility service (e.g., ride sharing services, courier network services (CNS), microtransit services, ride sourcing services, scooter sharing services, alternative transit services, bike sharing services, etc.) may be worried about the consequences of their vehicle facing an accident or other incident (e.g., a critical event). For example, the driver may be concerned about safety, how much the critical event would cost the driver, how the critical event may affect the driver's rating, and/or whether the driver may end up in a lawsuit as a result of the critical event. Furthermore, a driver may worry about his or her own financial security (e.g., income) in light of the potentially debilitating costs incurred by an accident or incident to the driver's vehicle.

When drivers do face a critical event, they may become involved in long and inefficient processes for reporting the accident, collecting requested data, and/or submitting claims for recovery. For example, a driver may need to talk to a number of parties over the phone, e.g., the shared mobility company, an insurance provider, police, etc., and repeat information, which may lead to frustration and added stress. Furthermore, there may a discrepancy of information sent or received from the various parties.

The present disclosure may address one or more of the shortcomings described above.

SUMMARY

In light of the foregoing background, the following presents a simplified summary of the present disclosure in order to provide a basic understanding of some aspects of the features described herein. This summary is not an extensive overview of all of the features described herein. The following summary merely presents some concepts in a simplified form as a prelude to the more detailed description provided below.

Systems and methods are described for using a centralized contact point (e.g., hub) for a user for automated recovery after a critical event in shared mobility services. By allowing a single point of contact, the centralized contact point or hub may improve the partner driver's experience seeking insurance claim recovery, may optimize claims efficiency, and may assist in building more scalable and extensible platforms for the shared mobility industry. One example method comprises: receiving, by the computing device from the first user device via the communication network, a notification of a critical event, first vehicle information of a first vehicle associated with the critical event, and second vehicle information of a second vehicle associated with the critical event; receiving, by the computing device from the first user device via the communication network, first damage information related to the critical event; analyzing, by the computing device, the second vehicle information of the second vehicle to identify the second vehicle; determining, by the computing device, a second user device associated with the second vehicle based upon identifying the second vehicle; establishing, by the computing device via the communication network, communication with the second user device; transmitting to the second user device, by the computing device via the communication network, a request for an input wherein the input is second damage information related to the critical event; receiving, by the computing device via the communication network, the second damage information from the second user device; comparing, by the computing device, the first damage information to the second damage information; generating, by the computing device, a response certainty score based on the comparison of the first damage information and the second damage information; determining, by the computing device, that the response certainty score satisfies a confidence value threshold; and determining, by the computing device, a fault assessment for the critical event.

In accordance with other embodiments of the present disclosure, an example system comprises: computing device. A computing device may comprise: one or more processors and a memory storing computer-executable instructions that, when executed by the one or more processors, cause the computing device to: communicatively couple to a first user device via a communication network, the first user device configured to generate a user interface; receive, from the first user device via the communication network, a notification of a critical event, first vehicle information of a first vehicle associated with the critical event, and second vehicle information of a second vehicle associated with the critical event; receive, from the first user device, first damage information related to the critical event; analyze the second vehicle information of the second vehicle to identify the second vehicle; identify a second user device associated with the second vehicle based upon identifying the second vehicle; establish, via the communication network, communication with the second user device; transmit, via the communication network, a request for an input to the second user device, wherein the input is second damage information related to the critical event; receive, via the communication network, the second damage information from the second user device; compare the first damage information to the second damage information; generate a response certainty score based on the comparison of the first damage information and the second damage information; determine that the response certainty score satisfies a confidence value threshold; and determine a fault assessment for the critical event.

In accordance with other embodiments of the present disclosure, one or more non-transitory computer readable media stores computer-executable instructions. When these computer-executable instructions are executed by a computing device, the computing device may perform one or more of the methods described herein.

Other features and advantages of the disclosure will be apparent from the additional description provided herein.

The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

A more complete understanding of the present invention and the advantages thereof may be acquired by referring to the following description in consideration of the accompanying drawing, in which like reference numbers indicate like features, and wherein.

DETAILED DESCRIPTION

Figure 1:
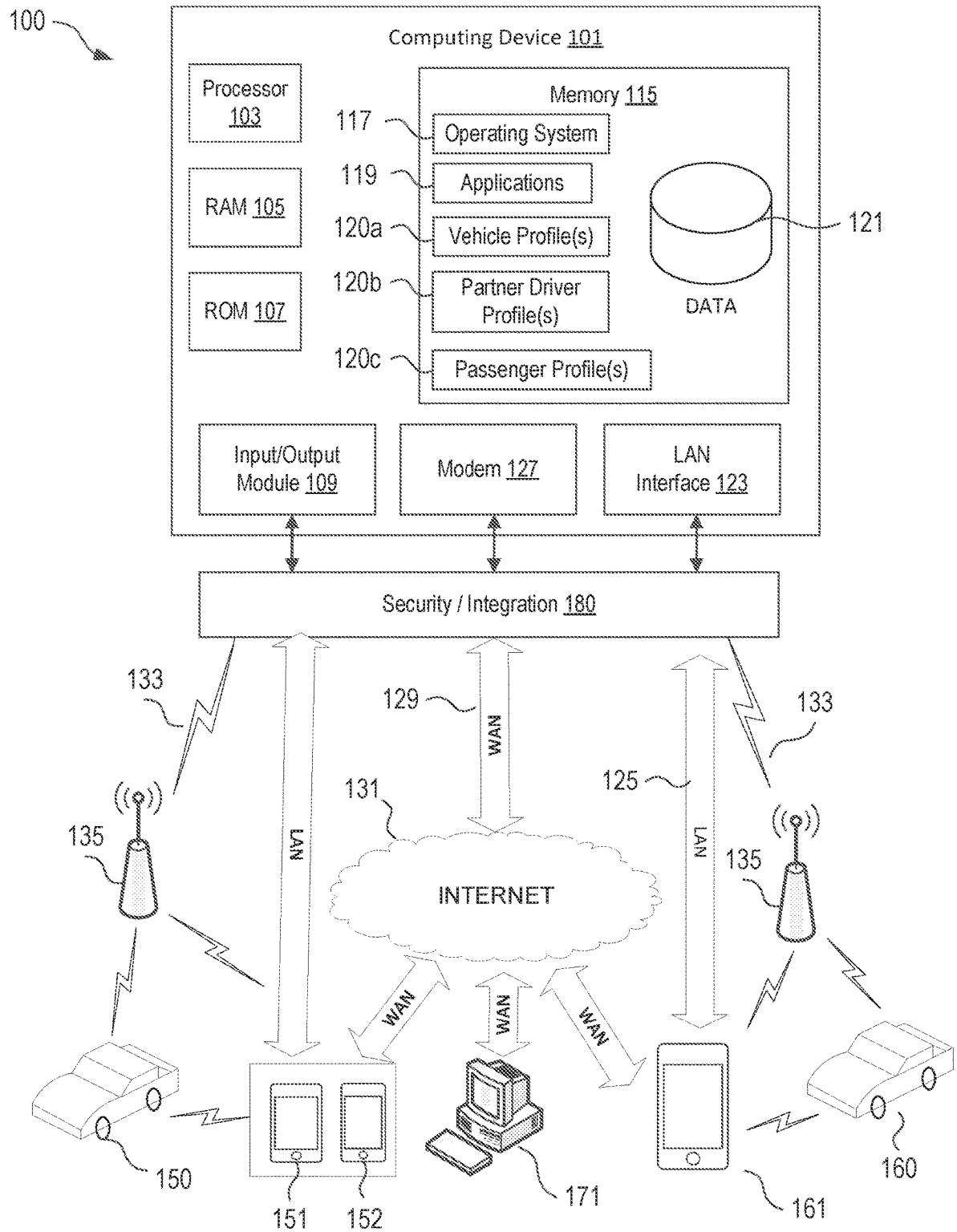
FIG. 1 is a diagram of an example computing device and operating environment in which one or more aspects described herein may be implemented.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

An automated centralized system (e.g., a hub) may serve the needs of various parties (e.g., partner driver, insurance provider and/or carrier, repairer, employer, etc.) typically involved during a critical event (e.g., vehicle accident or vehicle incident) and during a claim process following the critical event. In some aspects, a partner driver may refer to a driver of a vehicle involved in a shared mobility operation (e.g., UBER driver, LYFT driver, etc.). An employer may refer to the employer of the partner driver (e.g., a company associated with a shared mobility service). For example, an employer of a shared mobility service, such as a ride sharing or a ride sourcing service, may employ a plurality of partner drivers that each may drive a vehicle. The employer may at least partly conduct a business of shared mobility operations.

The partner driver's needs may include, but are not limited to, reporting the critical event, filing a claim (e.g., for recovery based on the critical event), notifying an employer of the partner driver, reporting specific characteristics of the critical event to an insurance provider, providing additional information requested by the insurance provider (e.g., photos of damage), receiving any estimate of payments to be received or to be incurred, disputing an estimate of payments, submitting payments, and getting a vehicle fixed.

The insurance carrier's needs may include, but are not limited to, receiving notifications of a critical event faced by a partner driver; retrieving the partner driver's insurance plan information, communicating with the employer of the partner driver, receiving specific characteristics of the critical event, determining additional information of the critical event that may be requested from the partner driver and requesting the additional information (e.g., photos), processing or refining any multimedia content (e.g., photos) received, determining an estimate of payments to be awarded to or to be incurred and received from the partner driver, receiving and settling disputes involving the estimate of payments, receiving payment from one or more parties involved in the critical event.

As discussed previously, conventional methods of recovery for a partner driver following a critical event may be cumbersome and frustrating. Furthermore, conventional methods of recovery may overwhelm the partner driver with requests for information that may not necessarily be relevant to the critical event. Various embodiments of the present disclosure describe example systems and methods for alleviating the above described issues and meeting the needs of the various parties of a critical event by way of a centralized hub for automating recovery after the critical event. At least some example systems and methods presented herein may ease the recovery process by reducing a partner driver's point of contact to an application, program or interface (e.g., a "hub" as will be described herein). The automated process may allow the partner driver to avoid dealing with multiple parties during the recovery process following a critical event, and instead allow the partner driver to send or receive information via a user interface of the application, program, or software. The partner driver may access, send inputs, and receive information on the user interface via a user device of the partner driver. The application, program or software may be able to relay information it receives from the partner driver to parties traditionally designated to receive such information.

Furthermore, the automated recovery may be "dynamic," e.g., customizing each subsequent interaction with the partner driver based on information already obtained. As will be described further herein, at least some implementations of the "dynamic" automated recovery process may include identifying a list of aspects to describe a critical event; and subsequently expanding, eliminating, and/or otherwise updating the list of aspects based on information that is obtained regarding the critical event. Furthermore, some implementations may include using one or more sensors and database information to assess the validity of responses provided by the partner driver, e.g., via natural language input. Thus, systems and methods of the present disclosure may ease the burden from a partner driver following a critical event, by significantly reducing the requests for information sent to the partner driver. For example, instead of prompting the partner driver to respond to an exhaustive list of ten questions that may not all be relevant to the critical event, a centralized server may leverage previously obtained information from sensors, databases, and external computing systems to prompt the partner driver to respond to a significantly reduced number of questions to describe the critical event. Furthermore, the centralized server may subsequently provide the partner driver an audio, visual, and/or textual representation of the critical event to confirm before proceeding to generate damage assessments and/or insurance claims pertaining to the critical event.

As used herein, a "recovery" or "recovery process" may refer to any part of the process of compensating parties involved in a critical event (e.g., vehicle accident or incident) experienced by the partner driver. Thus, the recovery process may include the exchange of information describing a critical event, assessing fault and damages suffered at a critical event, filing an insurance claim; creating a notice of loss; requesting and receiving information for determining the validity of the claim or notice of loss, or for calculating claim payments; determining liability or coverage; estimating a claim payment; disputing the estimated claim payment; processing the claim payment; and repairing the vehicle involved in the critical event.

FIG. 1 is a block diagram of an example computing device 101 in an operating environment 100 in which one or more aspects described herein may be implemented. For example, the computing device 101 may be utilized by an operator of one or more servers that facilitate the automated recovery (e.g., of damages, insurance claims, etc.) after a critical event in shared mobility services. The one or more servers, which may be referred to as "hub" or "insurance hub" for simplicity, may be a centralized contact point for a partner driver and/or for any party during the critical event in the shared mobility services.

The computing device 101 may have a processor 103 for controlling overall operation of the device 101 and its associated components, including RAM 105, ROM 107, input/output module 109, and memory 115. As explained above, the computing device 101, along with one or more additional devices (e.g., terminals 150-152, 160-161, and 171, and security and integration hardware 180) may correspond to any of multiple systems or devices described herein, such as personal mobile devices, vehicle-based computing devices, insurance systems servers, hubs for automated recovery after a critical event (as will be described herein), devices or servers belonging to a vehicle manufacturer or dealer, internal data sources, external data sources and other various devices used to facilitate the automated recovery after a critical event. These various computing systems may be configured individually or in combination, as described herein, for receiving signals and/or transmissions from one or more computing devices, the signals or transmissions including data related to location of vehicle(s) or user device(s), damages incurred to vehicle(s), operating parameters of vehicle(s), operating parameters of vehicle(s) in a same or similar location to the vehicle(s), and the like; processing the signals or transmissions to facilitate an exchange with via a user of a user device (e.g., a partner driver, a passenger, etc.); generate a visual, textual, and/or audio representation of a critical event; perform a fault assessment; train machine learning algorithms and/or artificial intelligence for the recognition of damages, determination of fault, and/or quantifying damage; generating and processing insurance claims; facilitating the exchange of payment; determining repair options; and the like, using the devices of the systems for hub-based automated recovery after a critical event.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, information identifying vehicle(s) and their vehicle manufacturer(s) or dealer(s) (e.g., "vehicle profile(s)" 120a), information identifying drivers of the vehicles, such as drivers of vehicles in shared mobility services (e.g., "partner driver profile(s)" 120b)), information identifying users of the shared mobility services (e.g., "passenger profile(s)" 120c), and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within computing systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a user device 101, vehicle-based device 101, the hub 101, an insurance provider computing system 101, etc.), in order to receive and analyze the signals, transmissions, etc., including receiving signals and/or transmissions from one or more computing devices. The signals or transmissions may include data related to location of vehicle(s) or user device(s), damages incurred to vehicle(s), operating parameters of vehicle(s), operating parameters of vehicle(s) in a same or similar location to the vehicle(s), and the like; processing the signals or transmissions to facilitate an exchange with via a user of a user device (e.g., a partner driver, a passenger, etc.); generate a visual, textual, and/or audio representation of a critical event; perform a fault assessment; train machine learning algorithms and/or artificial intelligence for the recognition of damages, determination of fault, and/or quantifying damage; generating and processing insurance claims; facilitating the exchange of payment; determining repair options; and the like, using the devices of the systems for hub-based automated recovery after a critical event.

Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, receiving signals and/or transmissions from one or more computing devices, the signals or transmissions including data related to location of vehicle(s) or user device(s), damages incurred to vehicle(s), operating parameters of vehicle(s), operating parameters of vehicle(s) in a same or similar location to the vehicle(s), and the like; processing the signals or transmissions to facilitate an exchange with via a user of a user device (e.g., a partner driver, a passenger, etc.); generate a visual, textual, and/or audio representation of a critical event; perform a fault assessment; train machine learning algorithms and/or artificial intelligence for the recognition of damages, determination of fault, and/or quantifying damage; generating and processing insurance claims; facilitating the exchange of payment; determining repair options; and the like, using the devices of the systems for hub-based automated recovery after a critical event.

The computing device (e.g., a user device of a partner driver or passenger; vehicle-based system; insurance system server; an external computing system (e.g., municipal system, satellite system), etc.) may operate in a networked environment 100 supporting connections to one or more remote computers, such as terminals 150-152, 160-161, and 171. Such terminals may be user devices belonging to users of vehicles for shared mobility services (e.g., user devices 151 and 152 for users of a first vehicle and user device 161 for a user of a second vehicle). The user devices may include, for example, mobile communication devices, mobile phones, tablet computers, touch screen display devices, etc.). Users of a vehicle involved in shared mobility services may include a partner driver and may further include a passenger. Accordingly, user devices may be associated with a partner driver (e.g., user device 151) and a passenger (e.g., user device 152). The terminals may further include vehicle-based computing systems 150 and 160 (e.g., on-board vehicle systems, telematics devices, mobile phones or other personal mobile devices within vehicles). In some aspects, user devices may be connected or be a part of the vehicle-based computing systems. The terminals may further include external computing systems (e.g., external system 171), such as computing systems or servers of insurance providers, governmental or municipal offices, road safety offices, satellite systems, vehicle manufacturers or dealers, and the like, each of which may include some or all of the elements described above with respect to the road segment evaluation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

Also illustrated in FIG. 1 is a security and integration layer 180, through which communications are sent and managed between the device 101 (e.g., a user device, a vehicle-based computing device, a hub, an external system, etc.) and the remote devices (150-152, 160-161, and 171) and remote networks (125, 129, and 133). The security and integration layer 180 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a server 101 may comprise a set of web application servers configured to use secure protocols and to insulate the device 101 from external devices 150-152, 160-161, and 171. In some cases, the security and integration layer 180 may correspond to a set of dedicated hardware and/or software operating at the same physical location and under the control of same entities as device 101. For example, layer 180 may correspond to one or more dedicated web servers and network hardware in a vehicle and driver information datacenter or in a cloud infrastructure supporting cloud-based vehicle identification, driver and/or passenger identification, location identification, exchange with parties of a critical event for automated recovery, automated fault assessment, damage assessment, training of machine learning algorithms or artificial intelligence, and the like. In other examples, the security and integration layer 180 may correspond to separate hardware and software components which may be operated at a separate physical location and/or by a separate entity.

As discussed below, the data transferred to and from various devices in the operating environment 100 may include secure and sensitive data, such as confidential vehicle operation data, insurance policy data, vehicle profile data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, insurance servers, hub, external data source servers, or other computing devices in the system 100, by using the security and integration layer 180 to authenticate users and restrict access to unknown or unauthorized users. In various implementations, security and integration layer 180 may provide, for example, a file-based integration scheme or a service-based integration scheme for transmitting data between the various devices in an electronic display system 100. Data may be transmitted through the security and integration layer 180, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 180. The web services may be accessed by authorized external devices and users to support input, extraction, and manipulation of the data (e.g., vehicle data, driver data, passenger data, critical event data, location data, damage data, fault assessment data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, the Secure Sockets Layer (SSL) or Transport Layer Security (TLS) protocol may provide secure connections between servers 101 and various clients 150-152, 160-161, and 171. SSL or TLS may use HTTP or HTTPS to provide authentication and confidentiality. In other examples, such web services may be implemented using the WS-Security standard, which provides for secure SOAP messages using XML encryption. In still other examples, the security and integration layer 180 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 180 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of driver data, database of vehicle information, database of location information, database of roadside assistance issue information, etc.) is cached in a separate smaller database on an application server separate from the database server (e.g., at a user device, vehicle-based data, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of hub-based automated recovery after a critical event, such as faster response times and less dependence on network conditions when transmitting and receiving information pertaining to a critical event, driver information, vehicle information, location information, fault and damage assessment, insurance information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in the system components described herein may be configured to communicate using any of these network protocols or technologies.

Figure 2:
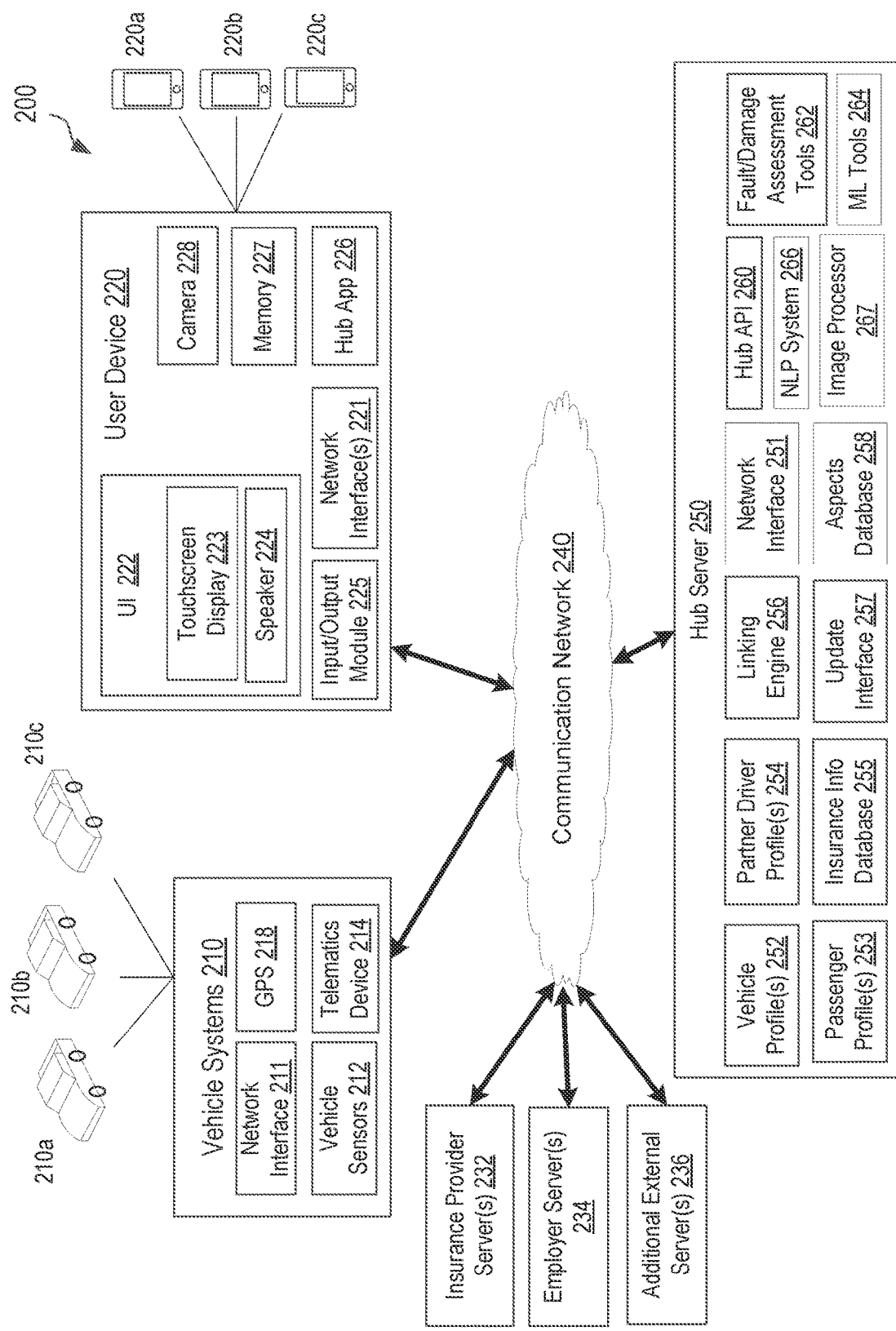
FIG. 2 illustrates a schematic diagram showing an example system for a hub-based automated recovery after a critical event in shared mobility services.

FIG. 2 illustrates a schematic diagram showing an example network environment and computing systems (e.g., devices, servers, application program interfaces (APIs), etc.) that may be used to implement aspects of the disclosure. At a high level the network environment 200 may comprise one or more vehicle systems 210 (e.g., for vehicles 210A-210C); one or more user devices 220 (e.g., user devices 220A-220C corresponding to users (e.g., partner drivers, passengers, etc.) of vehicles 210A-210C); a centralized server or computing system for performing an automated recovery after a critical event in ridesharing services that serves as a centralized contact point (e.g., hub server 250); one or more servers or computing systems associated with insurance providers or carriers (e.g., insurance provider server(s) 232); one or more servers or computing systems associated with an employer of the partner driver in the business of shared mobility services (e.g., employer server(s) 234); and other additional external devices, servers or APIs (e.g., additional external server(s) 236) interconnected over a communications network 240.

The communication network 240 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 240 may use a series of interconnected communication links (e.g., coaxial cables, optical fibers, wireless links, etc.) to facilitate communication between the hub server(s) 250, the user device(s) 220, the vehicle system(s) 210, the insurance provider server(s) 232, the employer server(s) 234, and the additional external server(s) 236. Each of the above-described systems may function on one or more computing systems or devices. In some aspects, one or more of the above described systems and servers may be connected; be a part of another one of the above-described systems and servers; or be components, features, or functions of a bigger computing system.

The one or more computing systems or devices of the above-described systems (e.g., the hub server 250, the user device(s) 220, the vehicle system(s) 210, the insurance provider server(s) 232, the employer server(s) 234, and the additional external server(s) 236) may include, for example, desktops, servers, smart phones, tablets or laptop computers with wired or wireless transceivers, tablets or laptop computers communicatively coupled to other devices with wired or wireless transceivers, and/or any other type of device configured to communicate via a wired or wireless network. The computing systems or devices may include one or more of the components of computing device 101, illustrated in FIG. 1. For example, the computing systems or devices may include at least a processor and a communication interface (e.g., a network interface) to communicate with one another.

The user device(s) 220 each may comprise mobile communication devices, mobile phones, tablet computers, touch screen display devices, etc., and may be associated with the users of a vehicle involved in shared mobility services. User devices 151, 152, and 161, as shown in FIG. 1 are examples of user device(s) 220. The user device(s) 220 may be associated with a partner driver of the vehicle and/or may be associated with a passenger of the vehicle. An example user device 220 may include volatile, non-volatile, and/or hard disk memory (e.g., memory 227) for storing information. For example, memory 227 may store applications, such as hub application 226 for performing various methods described herein for performing a hub-based automated recovery after a critical event. The hub application 226 may be hosted, managed, and/or facilitated by the hub server 250, as will be described herein. The hub application may use or be implemented upon a user interface (UI) 222 of the user device 220. The UI 222 may facilitate the exchange of information with the hub server 250 for an automated recovery after a critical event. Thus, the hub app 226, via the UI 222, may aid in alleviating the burden of the partner driver after a critical event by channeling communication and the presentation of information via a centralized contact point, e.g., the hub server(s) 250. The UI 222 may comprise, for example, a display 223 for the presentation of visual and/or textual information and a speaker 224 for the presentation of audio. Furthermore the UI 222 may be accompanied by an input/output module 225 to allow the user to input information (e.g., via a keyboard, touchscreen, microphone, etc.), or receive output information (e.g., via external speakers or other peripherals). Even further, the example user device 220 may include a camera 228 for generating various multimedia content (e.g., image(s), video(s), etc.). The hub application 226 may prompt the user to generate the multimedia content via the camera 228 in furtherance of the hub-based automated recovery after a critical event. A network interface 221 may facilitate communication with other computing devices and systems in environment 200 over communication network 240. Aspects described with respect to example user device 220 may be included in user device 220*a*, 220*b*, 220*c*, and the like.

The vehicle system(s) 210 may comprise computing systems, devices, hardware, and/or software implemented in various vehicles 210A-210C. The vehicles 210A-210C may be, for example, automobiles, motorcycles, scooters, buses, recreational vehicles, boats, or any other vehicles that may be used in shared mobility services and that may potentially be involved in critical events (e.g., accidents). A network interface 211 may allow the vehicle system 210 to communicate with other computing systems and devices of the environment 200 over the communication network 240.

An example vehicle system 210, aspects of which may apply to system 210*a*, 210*b*, 210*c*, and the like, may include various vehicle sensors 212 capable of detecting and recording various conditions at the vehicle and operational parameters of the vehicle. For example, sensors 212 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 212 may detect and store the external driving conditions, for example, external temperature, rain, snow, light levels, and sun position for driver visibility. For example, external cameras and proximity sensors 212 may detect other nearby vehicles, vehicle spacing, traffic levels, road conditions, traffic obstructions, animals, cyclists, pedestrians, and other conditions that may relate to vehicle accidents and accident characteristics. Sensors 212 also may detect and store data relating to moving violations and the observance of traffic signals and signs by the vehicle. Additional sensors 212 may detect and store data relating to the maintenance of the vehicle, such as the engine status, oil level, engine coolant temperature, odometer reading, the level of fuel in the fuel tank, engine revolutions per minute (RPMs), software upgrades, and/or tire pressure.

Vehicles sensors 212 also may include cameras and/or proximity sensors capable of recording conditions inside or outside the vehicle. For example, internal cameras may detect conditions such as the identity of the driver (e.g., using facial recognition software), the number of the occupants, the types of occupants (e.g. adults, children, teenagers, pets, etc.), and the seating/positioning of the occupants in the vehicles. Internal cameras also may detect potential sources of driver distraction within the vehicle, such as pets, phone usage, and unsecured objects in the vehicle. Sensors 212 also may be configured to collect data identifying a current driver from among a number of different possible drivers, for example, based on driver's seat and mirror positioning, driving times and routes, radio usage, etc. Sensors 212 also may be configured to collect data relating to a driver's movements or the condition of a driver. For example, vehicle systems 210A-210C may include sensors that monitor a driver's movements, such as the driver's eye position and/or head position, etc. Additional sensors 212 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 212 also may collect information regarding the vehicle's location, current and past driving routes, in order to classify the type of trip (e.g. work or school commute, shopping or recreational trip, unknown new route, etc.). In certain embodiments, sensors and/or cameras 212 may determine when and how often the vehicles stay in a single lane or stray into other lanes.

A Global Positioning System (GPS) and/or similar locational sensors (e.g., GPS 218), may be positioned inside the vehicle or may be external to the vehicle. The GPS 218 may be used to determine the route, lane position, road-type (e.g. highway, entrance/exit ramp, residential area, etc.) and other vehicle position/location data which may be used to analyze accidents and accident characteristics.

A telematics device 214 may store data collected by vehicle sensors 212 and/or the GPS 218. Also or alternatively, the data may be relayed by the telematics device 214 to, or sent directly to, the hub server 250 for automated recovery after the critical event. The hub server 250 may analyze the data to obtain accurate information pertaining to a critical event, perform an accurate fault and/or damage assessment, generate insurance claims, and provide repair options. The telematics device 214 may be computing devices containing many or all of the hardware/software components as the computing device 101 depicted in FIG. 1. In some cases, the telematics device 214 may receive vehicle sensor data, operation data, and driving data from vehicle sensors 212 and the GPS 218, and may transmit the data to one or more external computer systems over the communication network 240. The telematics device 214 also may store information identifying the type of their respective vehicle (e.g., vehicle identification), for example, the make, model, trim (or sub-model), year, and/or engine specifications.

The hub server 250 may comprise a one or more centralized computing systems or servers managing one or more functions of the above-described systems (e.g., the hub server 250, the user device(s) 220, the vehicle system(s) 210, the insurance provider server(s) 232, the employer server(s)

234, and the additional external server(s) 236, etc.) to facilitate methods and systems described herein for a hub-based automated recovery after a critical event in shared mobility services. The hub server 250 may be an example of computing device 101 shown in FIG. 1. At a high level, the hub server 250 may comprise one or more databases (e.g., vehicle profile(s) database 252, passenger profile(s) database 253, partner driver profile(s) database 254, insurance provider database 255, and/or aspects database 258, etc.), a linking engine 256, an update interface 257, one or more application program interfaces (APIs) (e.g., Hub API 260), a natural language processing (NLP) system 266, an image processor 267, fault/damage assessment tools 262, machine learning (ML) tools 264, and a network interface 251.

The update interface 257 and linking engine 256 may form a database management application, software, or plug-in that may be used to perform create, read, update, or destroy (CRUD) functions with respect to data stored in the one or more databases. For example, the linking engine 256 may be used to form associations or link suitable data from different databases together, and/or to create new data based on associations or linkages. The update interface 257 may be used to update databases (e.g., by adding or deleting) data stored in the one or more databases based on instructions from other parts of the hub server 250 (e.g., computer readable instructions stored in memory of the hub API 260) or information received from one or more other systems and devices of environment 200 (e.g., a user device 220, a vehicle system 210, an insurance provider server 232, an employer server 234, any additional external server(s) 236, etc.). The hub API 250 may send information to or receive information from the systems and devices of environment 200 over the communications network 240 via the network interface 251.

The hub server 250 may include one or more databases described below. For example, the hub server 250 may include a partner driver profiles database 254, that stores identifying or biographical information pertaining to a partner driver (e.g., partner driver profiles) and/or links the partner driver to a user device and to other profiles (e.g., vehicle profile of the vehicle used by the partner driver, insurance profile of the insurance provider(s) used by the partner driver or the vehicle of the partner driver, etc.). A passenger profiles database 253 may store identifying or biographical information pertaining to a passenger user of a shared mobility service (e.g., passenger profiles) and/or link the passenger to a user device and to other profiles (e.g., vehicle profiles of vehicles that the passenger has been in or partner driver profiles of partner drivers that drove vehicles carrying the passenger, etc.) A partner driver profile 254 or a passenger profile 253 may be based on, or associated with, an identifier of the user device 220 of the partner driver or passenger, respectively. The hub server 250 may further include a vehicle profiles database 252 for storing vehicle profiles. A vehicle profile may identify individual vehicles, e.g., by vehicle identification numbers, license plate numbers, and/or or other vehicle descriptors, based on a category of vehicles in which the individual vehicle falls under. The vehicle profiles database 252 may store information pertaining to one or more of a make, model, class, year of manufacture, color, type, or category of a vehicle. For example, the vehicle profiles database 252 may identify vehicles used by a partner driver or a passenger that may be involved in a critical event (e.g., car accident).

The hub server 250 may further include an aspects database 258, which may store identifying characteristics for a plurality of aspects to describe a critical event. An aspect of a critical event may refer to category of data describing the critical event. An aspect may be used to form, or may be a basis for, various queries presented to a partner driver to elicit information about a critical event. Thus, aspects may include damage related aspects (e.g., type of damage to the vehicle, severity of damage to the vehicle, location of the damage to the vehicle, cause of damage to the vehicle, an identification of an injury to a partner driver or to a passenger of the vehicle, a severity of the injury, medical costs associated with the injury, a cause of the injury, etc.); vehicle related aspects (e.g. vehicle identification, maintenance history of the vehicle associated with the critical event, velocity or acceleration of the vehicle associated with the critical event, vehicle trajectory of the vehicle associated with the critical event, etc.); aspects related to other vehicles (e.g., identification of other vehicles involved in the critical event, identification of drivers of the other vehicles, damage related aspects of the other vehicles, etc.); environmental aspects (e.g., location and temporal information pertaining to the critical event, weather data associated with the critical event, road conditions associated with the critical event); partner driver related aspects (e.g., driving behavior and, history of the partner driver, etc.), passenger related aspects (e.g., an identification of a passenger in the vehicle, a behavior of a passenger, etc.); and the like. As will be discussed in relation to the NLP system, the aspects database may be used to identify one or more aspects of a critical event being described through a natural language input. For example, the aspect database may include a library of terms that a NLP system may recognize from a natural language input in order to determine that a specific aspect of a critical event is being described.

The NLP system 266 may include various processors, libraries, and AI-based systems (e.g., machine learning (ML) tools 264) to analyze and convert natural language to one that could result in a computing system to perform substantive functions (e.g., augment and/or update list of aspects for a critical event, identify responses describing one or more aspects for the critical event). The NLP system 266 may be guided by a library and/or databases (e.g., aspects database 258, look-up tables, repository, etc.) and AI-based tools (e.g., ML tool 264) for various uses in natural language processing, including the undergoing of supervised and unsupervised learning from language data. Together with the aspects database 258, the ML tool 264 may support common NLP tasks, such as tokenization, sentence segmentation, part-of-speech tagging, named entity extraction, chunking, parsing, and coreference resolution. These tasks may be needed to build more advanced text processing services. The ML tool 264 may also include maximum entropy and perceptron based machine learning tools. Furthermore, the NLP system may utilize ML tools 264 to determine the certainty or validity of a response (e.g., "response certainty") describing an aspect of a critical event. A response certainty may indicate how necessary it may be to corroborate a response. For example, response of "the other driver was speeding towards me at 70 miles per hour," provided by a partner driver referring to the movement of vehicle of another driver that caused the car accident, would likely need to be corroborated by evidence, and thus the response certainty of the response may be low.

The image processor 267 may include or be implemented with various processors, libraries, and AI-based systems (e.g., machine learning (ML) tools 264) to analyze and convert images and other multimedia content to image data that could result in a computing system to perform substantive functions (e.g., recognize one or more features of a vehicle, recognize instances of damage, determine a severity of a damage, augment and/or update list of aspects for a critical event, etc.). The image processor 267 may be guided by a library and/or databases (e.g., aspects database 258, look-up tables, repository, etc.) and AI-based tools (e.g., ML tool 264) for various uses in image processing, including the undergoing of supervised and unsupervised learning from language data. Together with the aspects database 258, the ML tool 264 may recognize vehicles from image and other multimedia content, recognize quantitative and/or qualitative values (e.g., a severity of damage, a type of damage, a vehicle identification, etc.) for damage-related aspects and/or vehicle related aspects. For example, the ML tool 264 may use training data (e.g., reference images of vehicles with varying levels of damage) to create machine learning models to determine depth projection in order to assess the severity of a damage to a vehicle. The image processor 267 may use such models to analyze multimedia content in order to determine various quantitative and/or qualitative values for various aspects of a critical event.

The hub API 260 may manage, host, and/or facilitate the hub application 226 running on user device(s) 220. The hub API 260, through the hub application 226, may help to create a single point of contact for the partner driver for automated recovery after a critical event. The hub API 260, may utilize one or more of the databases of hub server 250, facilitate the exchange of information between the hub server 250 and one or more other computing systems and devices of environment 200, and may manage one or more functions of the systems and components of hub server 250. For example, the hub API 260 may receive notification of a critical event; allow the partner driver to submit natural language input to describe various aspects of a critical event; form an understanding of the critical event; request further information based on the received responses describing the critical event; assess the validity of the received responses; obtain corroborating data (e.g., multimedia content) and input from other sources (e.g., passengers, external systems, drivers of other vehicles involved in the critical event); leverage the fault/damage assessment tools to determine fault or assess damage; generate insurance claims; facilitate payment; and suggest repair options.

The fault/damage assessment tools 262 may comprise one or more software, applications, plug-ins, and/or tools for assessing the aggregated responses describing various aspects of a critical event, determining which party involved in the critical event may be at fault at to what degree, and estimating claims for damages. The aggregated responses may be received from user devices or systems associated with various parties involved in the critical event (e.g., partner driver, passengers, insurance providers, drivers of other vehicles, etc.) The fault/damage assessment tools 262 may utilize ML tools 264 to assign varying weights to various aspects of a critical event, and thereby assign weights to the corresponding responses describing the various aspects. The fault/damage assessment tools 262 may be used to determine liability of the various parties involved in the critical event. Furthermore, the fault/damage assessment tools 262 may rely on trained models from ML tools 264 to assess damage to a vehicle, e.g., to file an insurance claim.

The ML tools 264 may store trained (e.g., supervised machine learning) models, unsupervised models, and/or classification models to perform prediction, recognition, and/or assessment functions described herein. As discussed previously, the NLP system 266 may utilize machine learning models for the processing of natural language input, e.g., to identify aspects of critical events and/or to identify responses describing aspects of critical events. Furthermore, the fault/damage assessment tool may rely on trained machine learning models to recognize damage and/or assess the severity of damage to a vehicle from a generated multimedia content (e.g., image and/or video). Machine learning models may be trained based on reference data obtained from externals systems or devices (e.g., insurance provider server(s) 232, employer server(s) 234, etc.). Furthermore, the ML tools 264 may include an application, program, or software used to train the described models from the reference data.

Figure 3:
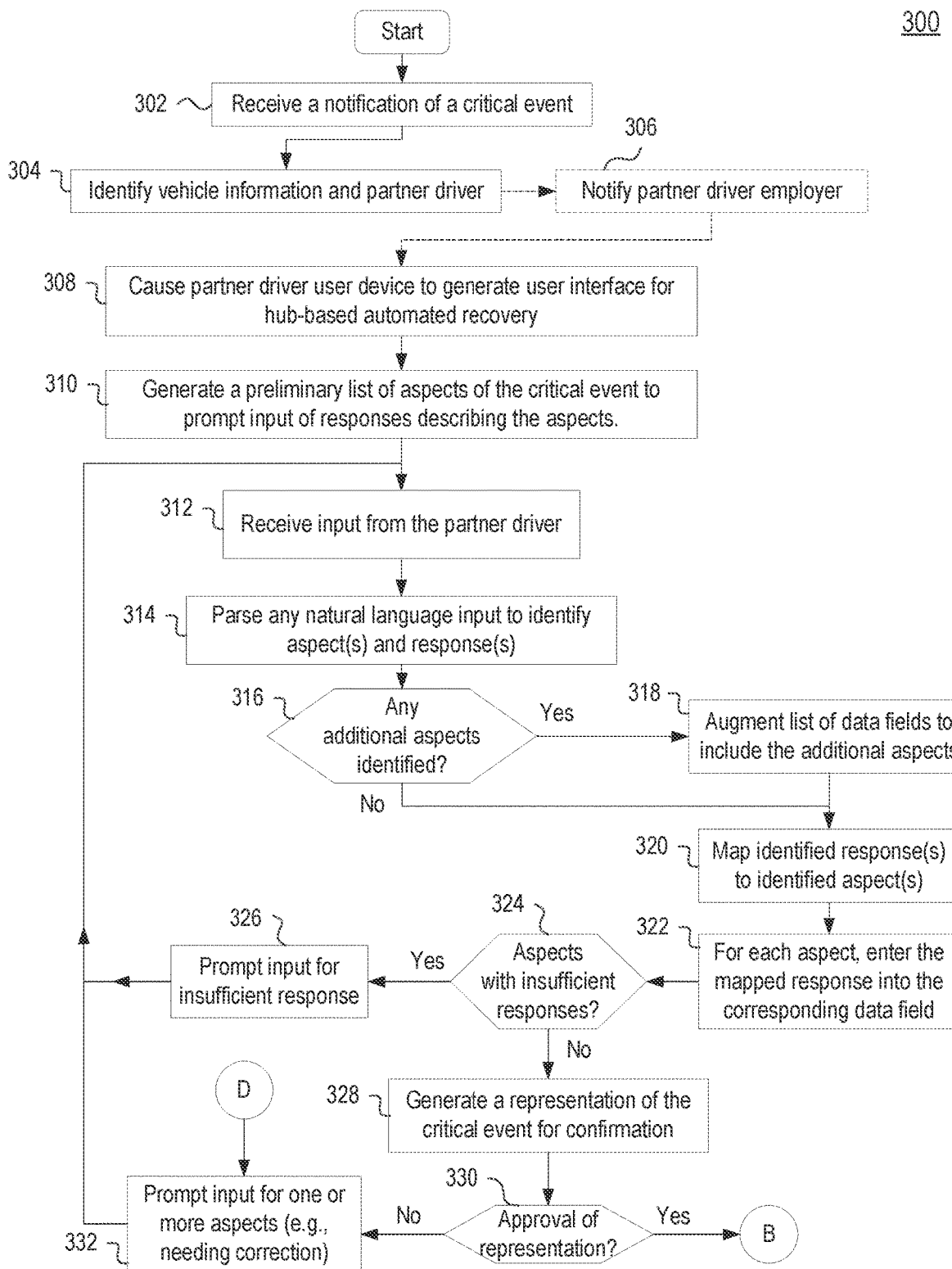
FIGS. 3-5 are flow diagrams for an example method that may be used to implement aspects of the disclosure.
Figure 4:
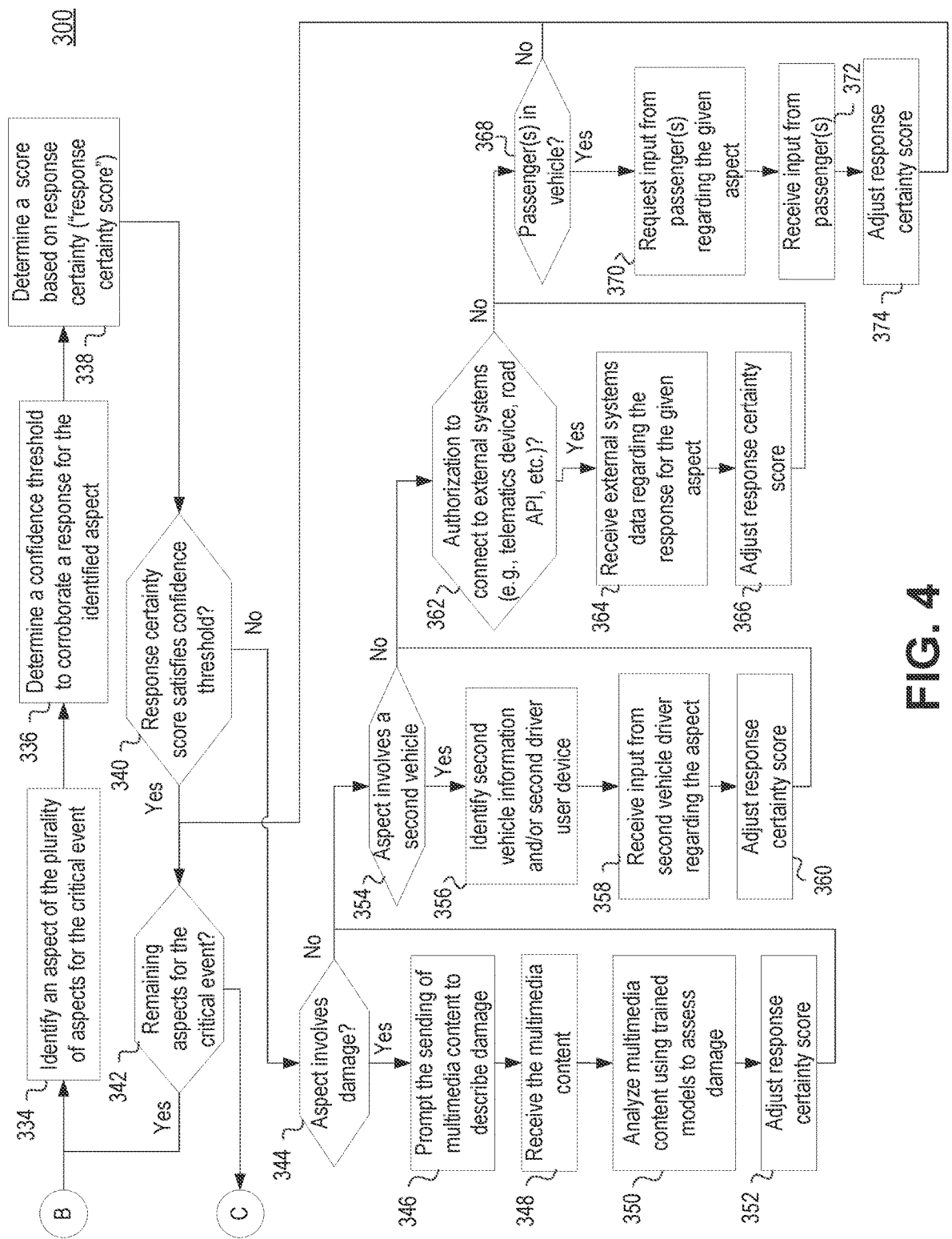
Figure 5:
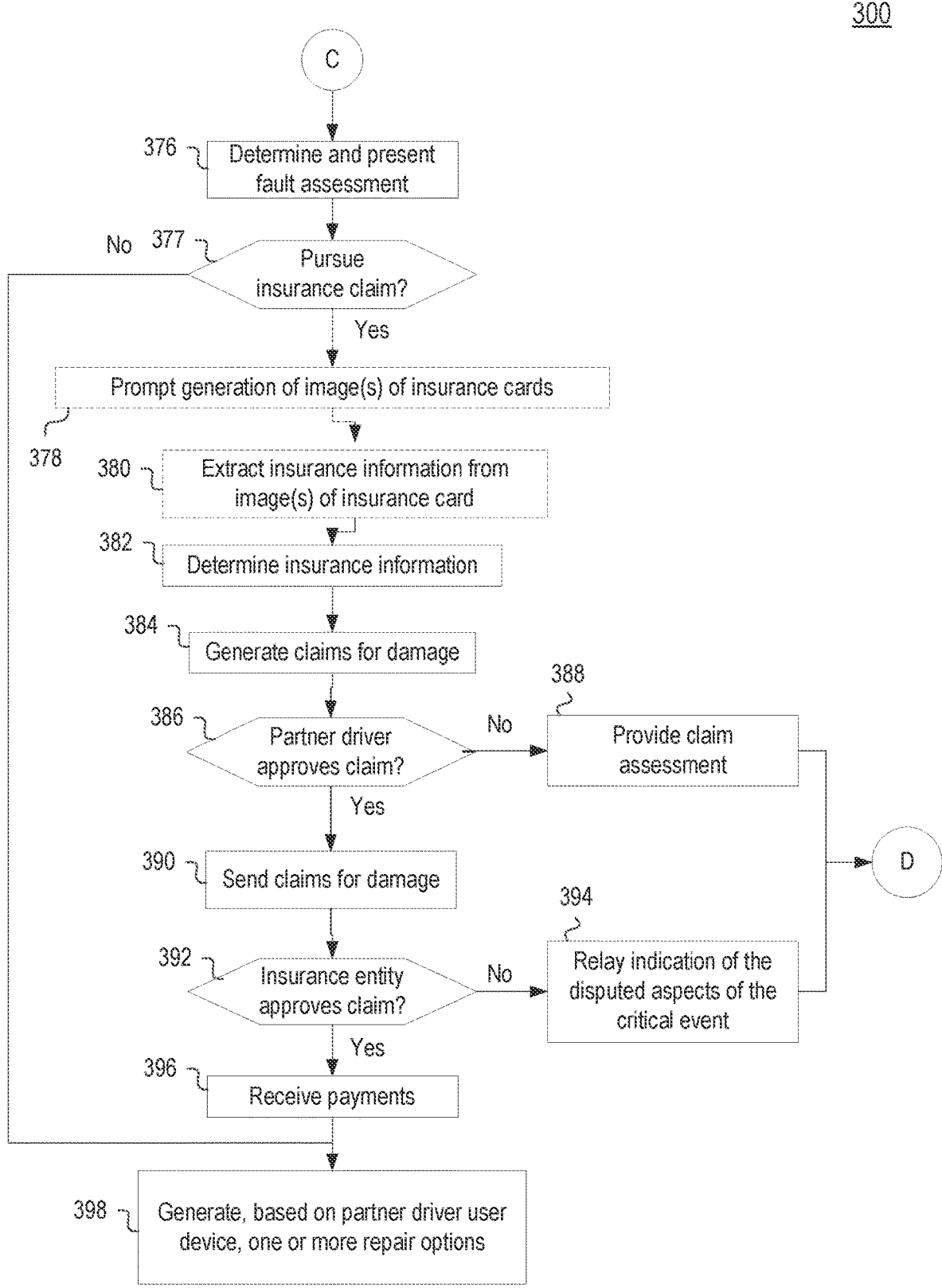

FIGS. 3-5 illustrate example flow diagrams that may be used to implement aspects of the disclosure. For examples, each of FIGS. 3-5 may refer to various stages of an example method 300 for a hub-based automated recovery after a critical event in shared mobility services. Method 300 may be performed by the hub server 250 shown in FIG. 2 and/or computing device 101 shown in FIG. 1. For simplicity, "hub server" may be used to refer to the performer of one or more steps of method 300.

Referring now to FIG. 3, method 300 may begin when the hub server receives a notification of a critical event (e.g., as in step 302). For example, a partner driver (e.g., a driver of a vehicle involved a shared mobility service or business (e.g., UBER, LYFT, etc.)) may suffer an accident involving the vehicle. After the accident, the partner driver may input a notification of there being a critical event into the user interface 222 of the hub application 226. Also or alternatively, the partner driver may simply call a phone number to send a notification of the critical event. The notification may be relayed to the hub server 250. The notification may identify the vehicle information of the vehicle involved in the critical event (e.g., the vehicle that the partner driver was driving) and/or may identify the partner driver (e.g., as in step 304). For example, the notification may be received from a user device associated with the partner driver, and the hub server may rely on stored information to map an identification of the user device to the partner driver and to the vehicle associated with the partner driver for shared mobility services. User device information, which may be stored in partner driver profile(s) 254, may be mapped to a vehicle identification, stored in vehicle profile(s) 252, via the linking engine 25 of the hub server 250 shown in FIG. 2. Geographical and/or temporal information associated with the critical event may also be received with the notification of the critical event, or as part of the notification of the critical event. For example, locational sensors on the user device (e.g., GPS) may detect a location of the user device when the critical event occurs or when the partner driver, via the user device, sends the notification of the critical event.

Furthermore, either the user device 220 may directly, via the input of the notification, or the hub server 250, after receiving the notification at step 302, may notify the employer of the partner driver (e.g., UBER, LYFT, etc.) of the critical event (e.g., as in step 306). For example, the received notification of the critical event and the identified vehicle information and partner driver, may be automatically relayed to the employer server 234. Additional information subsequently obtained in method 300 (e.g., evidence of damage to the vehicle) may also be relayed to the employer of the partner driver. The notification of the critical event may include locational and/or temporal information regarding the critical event, which may be obtained and received, e.g., via GPS and other locational sensors.

The hub server 250 may cause the user device associated with the partner driver to generate a user interface for the hub-based automated recovery (e.g., as in step 308). The user interface may be generated, for example, via an application in the user device (e.g., the hub application 226). The user interface and application may be used for the purpose of easing the burden of the partner driver after a critical event by providing a centralized contact to exchange information for automated recovery. As will be further described herein, method 300 may involve receiving various information pertaining to the critical event occurring (e.g., a photo of the accident or damage caused by the accident) in subsequent steps in order to facilitate an automated recovery (e.g., of an insurance claim) for the aggrieved party. By automatically notifying relevant parties through a single point of contact, the system may allay a partner driver's worries following a critical event. For example, in the absence of the system described herein, a partner driver may otherwise wonder where to begin the process of recovery (e.g. financially based on damages caused by the critical event).

At step 310, the hub server may generate a preliminary list of a plurality of aspects for the critical event to prompt an input of responses describing the plurality of aspects. A plurality of data fields corresponding to the plurality of aspects of the critical event may also be generated. The data fields corresponding to the preliminary list of aspects may be displayed on the user interface 222 of hub application 226. The list may be preliminary because the plurality of aspects may be expanded, reduced, replaced, or updated, based on subsequent input received from the partner driver and other parties in subsequent steps of method 300. An aspect of a critical event may refer to a qualitative and/or quantitative variable used to categorize a critical event. An aspect may form the basis for queries or data fields that elicit a response. As used in conjunction with aspects, a "response" may create a qualitative and/or quantitative value to the aspect, and may therefore describe the aspect of the critical event. Thus, aspects may include damage related aspects (e.g., type of damage to the vehicle, severity of damage to the vehicle, location of the damage to the vehicle, cause of damage to the vehicle, an identification of an injury to a partner driver or to a passenger of the vehicle, a severity of the injury, medical costs associated with the injury, a cause of the injury, etc.); vehicle related aspects (e.g. vehicle identification, maintenance history of the vehicle associated with the critical event, velocity or acceleration of the vehicle associated with the critical event, vehicle trajectory of the vehicle associated with the critical event, etc.); aspects related to other vehicles (e.g., identification of other vehicles involved in the critical event, identification of drivers of the other vehicles, damage related aspects of the other vehicles, etc.); environmental aspects (e.g., location and temporal information pertaining to the critical event, weather data associated with the critical event, road conditions associated with the critical event); partner driver related aspects (e.g., driving behavior and history of the partner driver); passenger related aspects (e.g., identification of passenger in the vehicle, behavior of passenger, etc.); and the like.

The generated preliminary list of aspects for the critical event may be used by the hub server 250 for the organization and/or filtering of relevant information during the exchange of information with the partner driver and other parties, via their respective user devices. Furthermore, the preliminary list of aspects may be generic enough to be applicable to all types of critical events, and thus the list of aspects may be relatively short (e.g., cause of the critical event, type of damage, and vehicle identification).

At step 312, the hub server may receive input from the partner driver based on the preliminary list of aspects of the critical event. The input may include, for example, one or more of a natural language input, multimedia content (e.g., an image, video, and/or audio file uploaded on to the hub application 226), a selection of a choice, a phone call, an SMS text message, or the like. For example, for aspects of a critical event where it may be easier to describe the aspect visually (e.g., a severity of a damage), the partner driver may submit a response to a data field corresponding to the aspect by uploading an image or video file on to the hub application 226. In some aspects, a multimedia content received as a response to describe one aspect of the critical event may be determined to reveal additional aspects of the critical event. The additional aspects may be augmented to the preliminary list of aspects describing the critical event to create an augmented list of aspects describing the critical event, as will be discussed further below.

A natural language input may be audio or text generated by the partner driver that involved free flowing words in a natural language, as opposed to an artificial language or computer code. In some aspects, for example, where the partner driver originally sent a notification of the critical event via a phone call, the natural language input may be a recording or audio file of the notification that the partner driver conveyed over the phone. Also or additionally, the partner driver may be prompted to deliver the natural language input via the user interface 222 generated by the hub application 226 (e.g., "Please explain what happened.").

In some aspects, the partner driver may input the notification of the critical event by selecting a functionality on the user interface, and submitting entries to various data fields. For example, a partner driver may select a button of "Got into an accident or incident?" on a user interface of the application into the user device of the partner driver, and then submit responses (e.g., via natural language input) to queries corresponding to the preliminary list of aspects generated in step 310.

For any natural language input that the hub server 250 may receive, the hub server 250 may parse the natural language input to identify aspect(s) and response(s) (e.g., as in step 314). The parsing may be performed via a natural language processor (e.g., NLP 366 of Hub API 260). The parsing may involve converting any audio to text, extracting recognizable text, and mapping the recognizable text to known or identifiable aspect(s) and/or response(s) (e.g., based on learned data).

As discussed previously, the list of aspects generated in step 310 may be dynamic and may expand, decrease, or change based on the responses submitted. For example, the partner driver may be prompted to submit a response to query, such as, "Please describe the damage to the vehicle." Based on a natural language input of "Another vehicle rear ended me," the hub server may expand the list of aspects to include aspects related to other vehicles involved in the critical event. In another example, based on the response of a video showing a damage to a rear end of the vehicle of the partner driver and also showing another vehicle still slammed into the vehicle of the partner driver, the hub server may expand the list of aspects to include aspects related to other vehicles involved in the critical event.

Thus, at step 316, the hub server may determine whether there are any additional aspects identified from the received input. If so, the list of data fields corresponding to the list of aspects of the critical event may be augmented to include data fields corresponding to the additional aspects (e.g., as in step 318). In the previous example, the additional aspects may involve aspects related to the other vehicle involved in the critical event, as the natural language input and the multimedia content input indicated that another vehicle had rear ended the vehicle of the partner driver.

If no additional aspects are identified based on the responses, the hub server 250 may map the identified response(s) to the identified aspect(s) (e.g., as in step 320). The mapping may be based on the data fields in which the user submitted the response, as the data fields may correspond to aspects of the critical event. In some implementations, the hub server 250 may rely on learned recognition of specific terms as being responses corresponding to specific aspects. For example, a numerical response may correspond to a query asking for a numerical value and therefore a quantitative aspect, while a qualitative response may correspond to a qualitative aspect. For each aspect, the hub server 250 may enter the response(s) identified from the parsed natural language input into the data fields corresponding to the aspect of the critical event for which the responses were intended for (e.g., as in step 322). It may be possible that the user might not have responded to each data field of each aspect sufficiently. Thus, at step 324, the hub server 250 may determine whether there are any aspects with insufficient responses. In the recurring example, the response of "Another vehicle rear ended me" may not sufficiently satisfy the query of "Please describe the damage to the vehicle." The hub server may not recognize, after parsing the natural language input, any terms indicating a severity, type, or other characteristic of damage to the vehicle.

If there are aspects or data fields with an insufficient or no response, the hub server 250 may prompt the input to make the response sufficient (e.g., as in step 326). In the recurring example, the hub server 250 may notify the partner driver, via a message on the UI 222, that the previous response did not answer the query of "Please describe the damage to the vehicle." Also or alternatively, a new query may be created based on the previous response, e.g., to elicit a desired response (e.g., "Please describe the damage to your vehicle caused by the rear-ending."). As the partner drive inputs a new response, steps 312 through 324 may be repeated.

If aspects on the list of aspects have been sufficiently described (e.g., via sufficient responses in the corresponding data fields), the hub server 250 may generate a representation of the critical event (e.g., as in step 328). The representation may be an audio, visual, and/or textual illustration of what occurred at the critical event. While the representation may be based on the input provided by the partner driver, the representation may also be based on inferences made by the hub server, and may organize and present information that the hub server has deemed relevant. The determination of information as being relevant may be based on the recognition of relevant terms during the processing of natural language input (e.g., during steps 312 through 322). The representation may be presented (e.g., displayed) by the hub application 226 on the user interface 222 of the user device 220 of the partner driver. For example, the representation may include key words and pictorial symbols describing relevant details of the critical event, such as, "rear end," "hit brakes," "car stopped at lights." The representation may describe damage related aspects pictorially to show a point of impact (e.g., an image of a car hitting the rear of another car) and the damage caused (e.g., an image of a broke windshield, an image of a wound, etc.). The representation may illustrate the geographic location of the critical event via a map. In some aspects, the representation may be presented in addition to, or may be juxtaposed with, a feedback of what the partner driver had submitted as input in step 312. For example, one section of the UI 222 may display what the partner driver submitted (e.g., "What you told us"), while another section of the UI 222 may display the representation generated by the hub server (e.g., "What we heard"). Both sections may continue to be augmented based on additional information submitted in subsequent steps.

The representation of the critical event may prompt the partner driver to confirm whether the hub server properly understood the details of the critical event as told by the partner driver. Thus, the hub server may wait to receive an approval or disapproval of the representation by the partner driver via the user device of the partner driver (e.g., as in step 330). If the partner driver does not approve of the representation (e.g., one or more aspects of the critical event are not described sufficiently or correctly), the hub server may prompt input from the partner driver at step 332, e.g., for the one or more aspects that need to be corrected. As the partner driver responds, steps 312 through 330 may be repeated until the hub server generates a representation of the critical event that the partner driver approves.

Referring now to FIG. 4, if the partner driver confirms the representation of the critical event, the hub server may proceed to corroborate the representation of the critical event, e.g., in steps 334 through 374. The responses from the partner driver submitted for each aspect of the critical event may be tested for validity. If a response to describe an aspect of the critical event is deemed to be dubious or uncorroborated (e.g., the response falls below a confidence threshold), the hub server may proceed to obtain additional data to describe the aspect of the critical event. The additional data may be received from alternate sources (e.g., user devices of the passengers of a vehicle, user devices of users of other vehicles involved in the critical event, external systems, etc.).

Thus, at step 334, in order to test the validity and/or corroborate the response describing each aspect of the critical event, the hub server 250 may identify an aspect of the list of aspects for the critical event. As discussed previously in relation to steps 310 and 318, the list of aspects for the critical event may be dynamic and may expand, reduce, or change as information regarding the critical event is received, corrected, corroborated, disproven, or changed. For the given aspect, the hub server 250 may determine a confidence threshold to corroborate the response that the partner driver provided for the identified aspect (e.g., as in step 336). It is contemplated that responses to some aspects may involve less corroboration than responses to other aspects. The confidence thresholds may reflect the level of corroboration needed for each aspect. In some aspects, the hub server may rely on the insurance provider server(s) 232 to determine the confidence thresholds for corroborate the responses for each aspect. Each insurance provider may assign a different weight to an aspect of a critical event, e.g., for insurance claims, and thus may require a different level of corroboration. For the given aspect, the hub server 250 may determine a response score based on response certainty (e.g., as in step 338). For example, some responses to describe an aspect of a critical event (e.g., "my vehicle is a red sedan) may understandably have more certainty (e.g., the hub server already has vehicle identification information for the partner driver) than other responses (e.g., "the other vehicle was speeding at 70 miles per hour.") The response score may quantify the certainty of the response based on the aspect being described (e.g., responses to describe aspects pertaining to other vehicles or other drivers may have less certainty), the length of the response, the consistency of information provided within a response or among responses to describe different aspects, etc.

For the given aspect, the hub server 250 may determine whether the response provided by the partner driver to describe the aspect satisfies the confidence threshold (e.g., as in step 340). If the response to describe the given aspect does satisfy the confidence threshold, the hub server 250 may determine whether there are remaining aspects in the list of aspects describing the critical event (e.g., as in step 342). If there are, the hub server 250 may shuffle to another aspect of the list of aspects describing the critical event, and repeat steps 334 through 340. If there are no more remaining aspects, the responses provided by the partner driver may be deemed to be corroborated, and the hub server 250 may proceed to steps 376 through 398 of method 300 shown in FIG. 5. If, at step 340, the given response score does not satisfy the confidence threshold for the aspect that the response is intended to describe, the hub server 250 may proceed to corroborate and/or test the response, e.g., by performing one or more of steps 344 through 374.

Thus at step 344, the hub server 250 may determine whether the given aspect is damage related. As discussed previously, damage related aspects of a critical event may include, for example, a type of damage to the vehicle, severity of damage to the vehicle, location of the damage to the vehicle, cause of damage to the vehicle, an identification of an injury to a partner driver or to a passenger of the vehicle, a severity of the injury, medical costs associated with the injury, a cause of the injury, etc. If the given aspect is damage related, the hub server may prompt the partner driver (e.g., via a notification through the hub app 226) to send multimedia content to describe the damage (e.g., as in step 346), or otherwise corroborate the response. The partner driver may use the camera 228 of the user device 220 to generate a multimedia content (e.g., an image, a video, etc.) of the damage and/or to otherwise describe the damage related aspect. The generated multimedia content may be uploaded to the hub app 226 and/or may otherwise be sent to the hub server 250. The hub server 250 may receive the multimedia content at step 348, which may be add to the response submitted for the damage related aspect. The multimedia content describing the damage related aspect may be analyzed to assess the damage (e.g., as in step 350). The analysis may involve trained machine learning models or artificial intelligence based on training data comprising of other multimedia content. The trained machine learning models may be trained from reference data using supervised learning and may be retrieved from ML tools 264. For example, for images showing damage to an exterior of a vehicle, a depth perception model may be used to assess the severity of damage (e.g., by measuring the depth of a dent on the vehicle).

Other methods to assess damage based on image and other multimedia content may also or alternatively be taken, for example, the systems and methods presented in U.S. Pat. No. 8,712,893, issued Apr. 29, 2014, and titled "Enhanced Claims Damage Estimation Using Aggregate Display," the text of which is incorporated herein by reference in its entirety.

Based on assessing the damage related aspects using the multimedia content, the hub server 250 may adjust the response certainty score for the response describing the damage related aspect (e.g., as in step 352). It is contemplated that multimedia content, especially after an authentication of the multimedia content, may provide more objectivity and/or veracity to describing a damage-related aspect, as opposed to an account by a person (e.g., a natural language input by a partner driver). If the damage assessment based on the multimedia content proves the original response submitted by the partner driver, the response certainty score may become more favorable for the partner driver. It is also possible for the damage assessment based on the multimedia content to contradict the original response submitted by the partner driver, which may lead to a more unfavorable response score.

Also or alternatively, the hub server 250 may determine whether the given aspect involves another vehicle ("second vehicle") (e.g., at 354). As discussed previously, aspects related to the second vehicle (e.g., any vehicles other than the vehicle used by the partner driver during the critical event) may include, for example, an identification of the second vehicle involved in the critical event, identification of drivers of the second vehicle, damage related aspects of the second vehicle, etc. The hub server 250 may identify vehicle information of the second vehicle ("second vehicle information") and/or the user device of the driver of the second vehicle ("second driver user device") (e.g., as in step 356). For example, based on any information provided by the partner driver in the response to describes aspects related to the second vehicle (e.g., the vehicle nameplate, the driver license of the driver of the second vehicle, etc.), the hub server 250 may rely on stored vehicle profile(s) 254 to identify the second vehicle. The hub server 250 may map an identification of the second user device to the second vehicle. The second user device information, which may be stored in driver profile(s) 254, may be mapped to a vehicle identification, stored in vehicle profile(s) 252, via the linking engine 25 of the hub server 250 shown in FIG. 2. The hub server 250 may establish communications with the second driver user device, e.g., to prompt input to corroborate and/or confirm details regarding the aspect involving the second vehicle. Accordingly, at step 358, the hub server 250 may receive input from the second vehicle driver regarding the aspect involving the second vehicle. For example, if the given aspect of the critical event concerns the speed of the second vehicle, and the partner driver submitted a response of 70 miles per hour, the second vehicle driver may be asked what the speed of the second vehicle was during the critical event. The second vehicle driver may also send a response of 70 miles per hour via the second user device and thus corroborate the response. Alternatively, the second vehicle driver may contradict the original response of the partner driver. Based on an aggregated response describing the given aspect, the aggregation of a response from the partner driver and a response from the second driver, the hub server 250 may thus adjust the response certainty score for the given aspect (e.g., as in step 360).

Also or alternatively, the hub server 250 may determine whether the partner driver has provided authorization to connect to external systems (e.g., at 362). The authorization may be provided by the partner driver, e.g., upon the installment of, and/or as contracted for the usage of, the hub application 226. Also or alternatively, the partner driver may be asked to provide the authorization when the hub server 250 is to perform step 362. The external systems may include, for example, one or more vehicle systems 210 (e.g., telematics device 214) of the vehicle used by the partner driver, computing systems or servers associated with a governmental body (e.g., road or traffic APIs), satellite systems, social media servers, etc. Authorization may be requested because data received from the external systems ("external systems data") may include private information of the partner driver (e.g., the driving history of the partner driver, background history, etc.). At step 364, the hub server 250 may receive the external systems data. The server may analyze the external systems data with respect to the response to the given aspect, e.g., to see whether the external systems data corroborates or contradicts the response to the given aspect. Based on the analysis, the hub server may adjust the response score for the response describing the given aspect (e.g., as in step 366).

Also or alternatively, the hub server 250 may determine whether there were passenger(s) in the vehicle used by partner driver during the critical event (e.g., as in step 368). For example, the hub server may query the computing system or server of the partner driver employer (employer server 234) involved in shared mobility services to determine if there were any passengers in the vehicle. If there were passenger(s), the hub server may request input from the passenger(s) (e.g., "passenger input") regarding the given aspect, e.g., to corroborate or disprove the response of the partner driver describing the given aspect (e.g., as in step 370). For example, the hub server 250 may request that the employer server 234 send the request to the passenger user devices. In some aspects, passenger user device identifications for the passengers may be obtained from the employer server 234, and the hub server 250 may directly establish communications with the passenger user devices. The passenger identifications and their corresponding passenger user device identifications may be stored, for example, in passenger profile(s) 253 of the hub server 250. At step 372, the hub server 250 may receive the input from the passenger(s) e.g., via the passenger user devices and/or the employer server 234. The hub server 250 may analyze the input from the passengers regarding the response to the given aspect, e.g., to see whether the input from the passenger(s) corroborate or contradict the response for the given aspect. Based on the analysis, the hub server 250 may adjust the response score for the response describing the given aspect (e.g., as in step 374).

After the response certainty score of a response for a given aspect has been adjusted based on the various additional evidence and/or input received e.g., from one or more of steps 344 through 374, the response certainty scores of responses for other aspects of the critical event may be assessed. Thus, at step 342, the hub server may determine whether there are remaining aspects of the critical event, for which the response from the partner driver needs to be evaluated for certainty. If so, steps 332 through 342 may be repeated until there are no remaining aspects for the critical event. Having received responses describing various aspects of the critical event, and having corroborated or qualified the responses, method 300 may proceed to steps 376 through 398 as shown in FIG. 5.

Referring now to FIG. 5, the hub server 250 may determine a fault based on the received information regarding the critical event (e.g., as in step 376). The fault assessment may be based on an assessment of the aggregated responses for the list of aspects assigned for the critical event. A fault assessment may be based on a score of each party involved in the critical event. The score of each party may be based on damages incurred and/or compensation owed. Thus, the fault assessment may be a predictor of whether a party (e.g., the partner driver) can receive payment for a claim for damage. Therefore, the fault assessment may be used to inform the partner driver, via a notification on the hub application, whether the critical event qualifies as an incident worth initiating an insurance claim for the partner driver. The partner driver may choose pursue or may choose to opt out of pursuing an insurance claim based on the fault assessment. The hub server 250 may determine whether to pursue or not to pursue an insurance claim based on this decision (e.g., as in step 377).

If the partner driver decides to pursue an insurance claim for damages, or chooses not to opt out of pursuing insurance claims, the hub server 250 may determine insurance information for the various parties involved in the critical event or of the vehicles used by the various parties (e.g., as in step 382). The various parties may include the partner driver, or a driver of another vehicle involved in the critical event. The hub server 250 may link stored insurance information from the insurance information database 255 to the profile of the partner driver under the partner driver profile(s) 254, or to the profile of the passenger under the passenger profile(s) 253, via linking engine 256. In some aspects, the system may automatically determine the insurance provider and/or carrier of the partner driver based on the locational information of the critical event, the residence of the partner driver or employer, or the registration information of the partner driver's vehicle. Information used to automatically determine the insurance provider or carrier may be supplied to the system when the partner driver inputs the notification of the critical event, or may be sent by the employer to the system. Also or alternatively, information used to automatically determine the insurance provider or carrier of a party involved in the critical event may be requested to be supplied by the system. The request may be sent to the partner driver via the user interface 222 and hub application 226, or to the employer.

For example, at step 378, the hub server may prompt the partner driver to generate an image of an insurance card of any parties (including the partner driver) involved in the critical event. For example, during the scene of an accident between the vehicle used by the partner driver and a vehicle used by another driver, the partner driver may take a snapshot of the insurance card of the vehicle used by the another driver (e.g., "second vehicle"). The hub application 226 may use the snapshot to obtain an image of the insurance card for the second vehicle. The generated image of the insurance cards may be uploaded onto the hub application 226. At step 380, the hub server 250 may extract insurance information from the images (e.g., after the images are uploaded on to the hub application 226). In some aspects, other parties involved in the critical event (e.g., the passenger(s) and/or the second vehicle driver) may also generate and send image(s) of an insurance card via their respective user devices, e.g., via hub application 226. The image of the insurance card, and/or insurance information extracted from the insurance card, may be saved in the memory 227 of the user device 220 of the respective party, and may be accessed from the memory 227 through the hub application 226. Also or alternatively, insurance information may be entered into the hub application 226 manually by the partner driver (or other party) via the respective user device, and the insurance information may be received by the hub server. As used herein, the insurance information of a party may include one or more of policy number, coverage number, plan number, member identification, an insurance type, predetermined allocation of fault or liabilities between passengers and a partner driver, insurance related contractual obligations between the partner driver employer and the partner driver, etc.

At step 384, the hub server 250 may generate claims for damage. As part of the claims, the hub server 250 may determine an estimate of the payments to be transacted. The payments may refer to one or more transfer of resources between the parties that may be involved in the critical event or the recovery following the critical event. The parties may include, but are not limited to, the partner driver, a passenger of the vehicle of the partner driver, another driver of a vehicle (e.g., as in a vehicle that collided with, cause damage to, or was collided or damaged by the vehicle of the partner driver), an insurance provider or carrier (e.g., of the partner driver or another driver), an employer of the partner driver or another driver, a repairer, or the vehicle manufacturer or dealer. The transfer of resources may be estimated to be an amount that would make one or more parties of the critical event even in light of damages that may have occurred. The damages may include physical or tangible damage resulting in a devaluation of a vehicle, lost income or opportunity, medical damage, or the like. In at least one example, the system may estimate payments for claims of damage to the vehicle of the partner driver for which the insurance provider or carrier may compensate the partner driver, in accordance with an agreed upon insurance policy. Furthermore, the estimated payments may include any unallocated loss adjustment expenses (ULAE), allocated loss adjustment expenses (ALAE), and indemnity.

After the claims for damage have been generated, the partner driver may be presented with the claims for review via the user device. For example, hub application 226 may display a copy of the draft claim to the partner driver on the user interface 222 for the partner driver to review, dispute, and/or approve. The hub server may determine whether the partner driver approves the claim (e.g., as in 386). If the partner driver disputes (e.g., does not approve) the claim, the hub server 250 may generate and provide an explanation of how the various aspects of the critical event led to the generation of the claims (e.g., a claim assessment) (e.g., as in step 388). The claim assessment may be displayed by the hub application 226 on the user interface 222 of the user device 220 of the partner driver. Furthermore, the hub server 250 may prompt the partner driver to input a response for one or more aspects of the critical event for which the partner driver believes is the cause for the dispute (e.g., as in repeating step 332). As the partner driver responds, one or more of steps 312 through 386 may be repeated.

If the partner driver approves the insurance claim, the hub server 250 may send the claims for the damage to the party at fault and/or to the appropriate insurance provider of the party at fault. For example, after determining insurance information for the various parties involved in the critical event (e.g., at step 382), the hub server 250 may use the insurance information of the party at fault to retrieve the address of the insurance provider server from the insurance provider database 255. The address of the insurance provider server may be used to establish communications with the insurance provider of the party at fault, and to send the insurance claim. The party at fault or the insurance provider of the party at fault may be prompted by the hub server to review the insurance claim to approve and/or dispute it. For example, the party at fault may believe that a claim for damages is too high of an amount and may be based on insufficient evidence provided for an aspect of a critical event. Thus, at step 392, the hub server 250 may determine whether the insurance provider of the party at fault approves the claim. If the insurance claim is disputed, the insurance provider server may indicate one or more aspects of the critical event, for which information is disputed. The hub server may relay the indication of the disputed one or more aspects to the partner driver user device (e.g., as in step 394). The partner driver may submit new and/or updated responses for those one or more aspects of the critical event, and one or more of steps 312 through 386 may be repeated. If there are no disputes at step 392, the hub server 250 may facilitate the exchange of payments (e.g., via the use of third party payment services), at step 396.

In such aspects, there may be a transfer of resources from the insurance provider or carrier to the account of the party seeking payments. The automated processes of reporting of the critical event, requesting of pertinent data for calculation of claim payments, facilitating the input of the pertinent data, estimation of claim payments, dispute settlement, and payment processing may alleviate the burdens that a partner driver faces when dealing with various parties following a critical event. For example, the system and method described herein may obviate the need to talk to many parties and tediously report the same information.

At step 398, the hub server may present one or more repair options through the hub application 226 on the user device 220. The one or more repair options may be based on specific aspects of the critical event (e.g., the cause of damage, type of damage, vehicle identification, etc.). Various methods of determining repair options based on the critical event may be taken, for example, the systems and methods described in U.S. Pat. No. 9,773,281, issued Sep. 26, 2017, and titled "Accident Detection And Recovery," the text of which is incorporated herein by reference in its entirety.

The location of the repair options may be based on the proximity to the location of the partner driver user device and/or the location of the vehicle used by partner driver, e.g., via GPS and/or other location sensors. The partner driver may thus select one of the repair options and/or may use information presented in the repair options to proceed to have the vehicle fixed. Due to the expediency of the automated triage assessment, claim processing, and claim payments may allow the partner driver a peace of mind when asking a repairer to have the vehicle fixed. In some aspects, the repairer may be compensated directly from the insurance provider or carrier. Thereafter, the partner driver may return to work.

Figure 6:
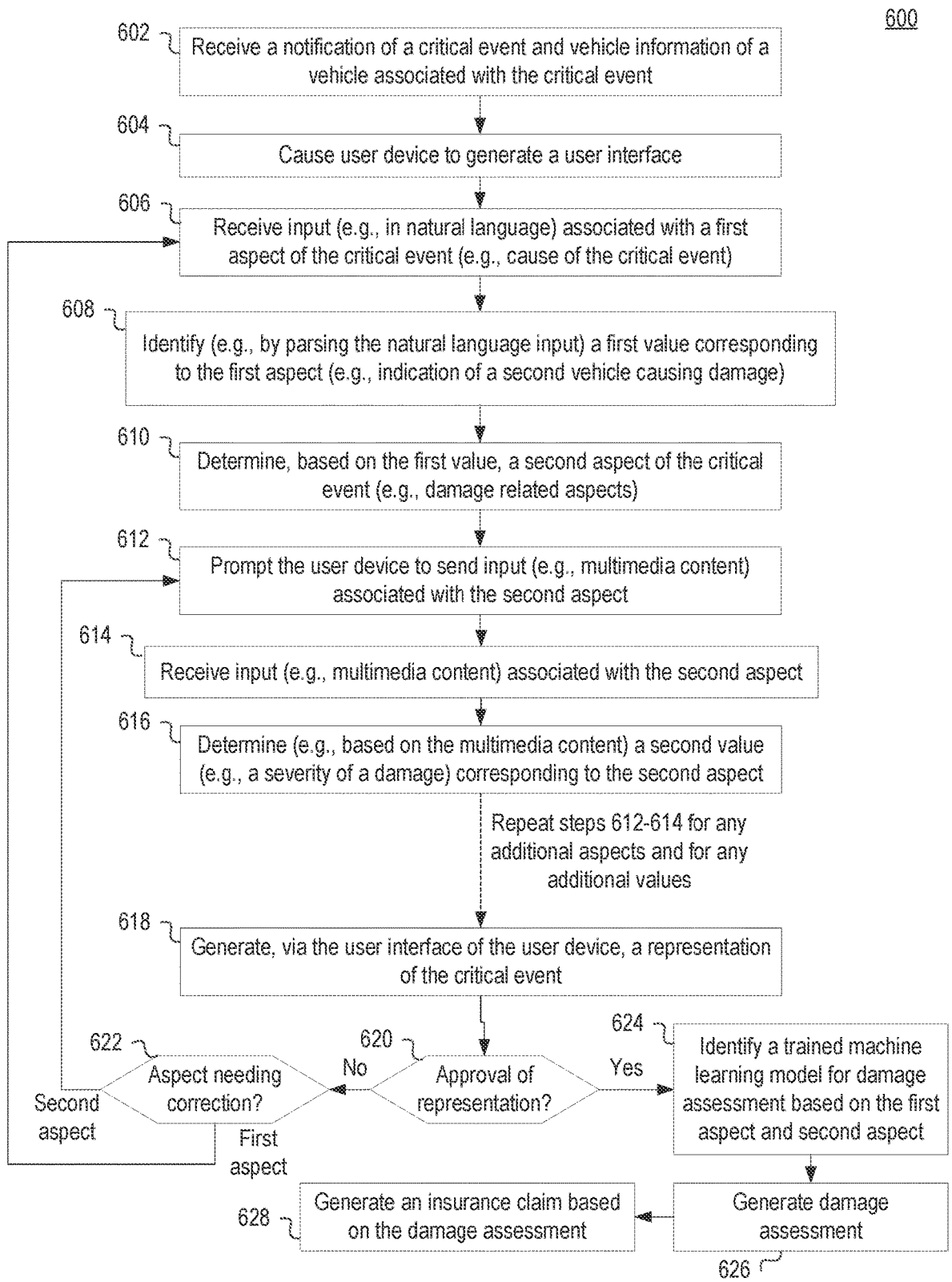
FIG. 6 illustrates a flow diagram of a specific example of a method for hub-based automated recovery after a critical event in shared mobility services.

FIG. 6 illustrates a flow diagram of another example of a method (e.g., method 600) for hub-based automated recovery after a critical event in shared mobility services. Method 600, shown in FIG. 6, may be performed by the hub server 250. As explained previously, the hub server 250 may contain some or all of the components of computing device 101 and some or all of the components shown for the hub server 250 in FIG. 2. For simplicity, hub server 250 is described as the performer of some or all of the steps of method 600.

At step 602, the hub server 250 may receive a notification of a critical event and receive a vehicle information of a vehicle associated with the critical event. Steps 302 and 304 in FIG. 3, discuss specific implementations of step 602 in further detail. The hub server 250 may also notify the partner driver employer, based on the notification (e.g., as was discussed in relation to step 306 in FIG. 3). As also previously discussed in relation to step 308 in FIG. 3, the hub server 250 may cause the user device associated with the partner driver (e.g., partner driver user device) to generate a user interface for hub-based automated recovery (e.g., as in step 604).

The hub server 250, by way of managing the hub application 226 on the partner driver use device 220, which utilizes the user interface 222 of the partner driver user device 220, may guide the partner driver into providing information about the critical event. For example, the hub server 250 may prompt the partner driver to provide input to describe the critical event. As explained previously, the hub server may categorize information about a critical event into aspects, and may initially create a preliminary list of aspects of the critical event. The preliminary list may dynamically evolve (e.g., expand by including new aspects, shorten by eliminating aspects, replace aspects, etc.) The hub server 250 may organize the aspects as data structures (e.g., data fields). As the hub server 250 receives responses that described the aspects, the responses may be processed (e.g., via natural language processing performed by the NLP system 266, and/or image processing performed by the image processor 267) to identify quantitative and/or qualitative values. The values qualify, describe, and/or provide a numerical description for a given aspect. The values may be entered into the data structures assigned for the aspects of the critical event. Furthermore, based on the responses and/or values, new aspects may be added, and previous aspects may be deleted and/or updated.

Thus, at step 606, the hub server 250 may receive input from the partner driver user device. The input may be provided after prompting the user device to provide input for a specific aspect (e.g., first aspect) of the critical event. The input may be in one of various forms, including, a natural language input in the form of audio or text (e.g., text entry into a data field provided via the user interface 222 on the partner driver user device 220). The first aspect may include, for example, a cause for the critical event, to which the partner driver may respond by explaining the cause for the critical event by way of a natural language entry. The input may be processed by the hub server 250, depending on the form of the input (e.g., natural language processing for a natural language input).

At step 608, the hub server 250 may identify a value (e.g., a first value) corresponding to the first aspect from the received and processed input. For example, the NLP system 266 may process the natural language input describing the cause of the critical event (e.g., by parsing the natural language entry) and identify an indication of a second vehicle causing damage. At step 610, the hub server 250 may determine, based on the first value (e.g., an indication of a second vehicle causing damage), a second aspect of the critical event (e.g., damage related aspects).

Furthermore, at step 612, the hub server 250 may prompt the user device to send input (e.g., multimedia content) associated with the second aspect. For instance, the mobile application may indicate to the partner driver, via the user interface 222, "Please upload images of the damage caused to your vehicle." This prompting may cause the partner driver to provide input (e.g., by generating images and other multimedia content showing damage to the vehicle) associated with the second aspect (e.g., damage-related aspects). The hub server 250 may receive the input (e.g., multimedia content) associated with the second aspect at step 614.

The hub server may determine (e.g., based on the multimedia content) a second value (e.g., a severity of a damage) corresponding to the second aspect (e.g., as in step 616). For example, the image processor 267 of the hub server 250 may process a received image of a damage to the vehicle of the partner driver, and determine a measurement of a severity of damage. The severity of damage may be a quantitative value (e.g., the second value corresponding to the second aspect).

Thus, aspects like the second aspect may be determined and added to the list of aspects of the critical event based on responses provided to the hub server 250. These aspects may in turn cause the hub server 250 to request and receive further information. For example, like steps 612 through 614, the hub server may determine that there are further aspects to the critical event (e.g., second vehicle related aspects) based on the responses provided to the hub server (e.g., the first value indicating the second vehicle causing the damage). Requests for additional input may be prompted, and these requests may be sent to user devices and systems associated not only with the partner driver but also other parties involved in the critical event (e.g., second driver user device), as discussed previously in relation to method 300.

At step 618, the hub server 250 may generate, via the user interface of the user device, a representation of the critical event. The partner driver, via the user interface of the user device, may indicate an approval or disapproval of the representation (e.g., as in step 620). If there is a disapproval, the partner driver may indicate the aspect of the critical event in the representation that may need correction (e.g., as in step 622). Steps 328 through 332 in FIG. 2 describe implementations of steps 618 through 622 in further detail.

If the hub server 250 receives an approval for the representation, the hub server 250 may generate a damage assessment for the critical event. The damage assessment may indicate the various information (e.g., quantitative and/or qualitative values) associated with damage-related aspects of the critical event (e.g., types of damages incurred, severity of damage, cost to repair damage, an injury to a partner driver or to a passenger of the vehicle, a severity of the injury, medical costs associated with the injury, a cause of the injury, etc.). The damage assessment may also indicate a fault or liability associated with each instance of damage. The damage assessment may be presented hub server 250 to the partner driver via the user interface 222 on the user device 220.

In some implementations, the hub server may rely on machine learning models to generate the damage assessment. These machine learning models may be trained based on reference training data obtained by the hub server 250 from external systems to predict various metrics for the damage assessment (e.g., costs for repairing damage, compensation to be claimed, etc.). The machine learning models may be trained via supervised learning involving a domain (e.g., values for a number of different aspects for a critical event), and a range (e.g., actual compensation claimed) from a plurality of reference critical events. Thus, different machine learning models may involve a different set of aspects, and may be further distinguishable based on the vehicles involved. The trained machine learning models may be stored and/or be a part of the ML tools 264 of the hub server 250. The hub server may identify a trained machine learning model for generating the damage assessment based on the first aspect and the second aspect (e.g., as in step 624). Feature vectors comprising the values for each aspect may be formed for inputting into the trained machine learning model. The trained machine learning model, identified in step 624, may thus be used to generate the damage assessment in step 626.

Other methods of determining various metrics (e.g., compensation to be claimed) for a damage assessment may also or alternatively be taken, for example, the systems and methods described in U.S. Pat. No. 10,169,824, issued Jan. 1, 2019, and titled "Virtual Collaboration," the text of which is incorporated herein by reference in its entirety.

At step 628, the hub server 250 may generate an insurance claim based on the damage assessment. Step 384 describes an implementation of step 628 in further detail. In some implementations, the hubs server 250 may have received additional information (e.g., insurance information of relevant parties involved in the critical event), as discussed in relation to steps 376 through 382 in FIG. 5. In some implementations, the partner driver may indicate an approval or a disapproval of the damage assessment prior to the generation of an insurance claim. In subsequent steps, the hub server 250 may process the insurance claim, relay any disputes to the insurance claim, facilitate payments, and generate one or more repair options, as discussed previously. Various methods of processing the insurance claim and facilitating payments may be taken, for example, the systems and methods described in U.S. patent application Ser. No. 14/562,036, filed Dec. 5, 2014, and titled "Estimated A Cost To Repair A Damaged Item Without Physically Inspecting The Item," the text of which is incorporated herein by reference in its entirety.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, while the aspects described herein for a hub-based automated recovery after a critical event has been described in the context of shared mobility services as it relates, e.g., to ride sharing services, the aspects may be applicable to other industries, use cases, and environments. For example, the aspects may be applicable to courier network services (CNS) (e.g., for-hire delivery services by partner drivers), microtransit services (e.g., shared transportation systems on vans and/or buses operated using partner drivers), ride sourcing services (e.g., transportation network companies that connect partner drivers with passengers using mobile applications), scooter sharing services, alternative transit services (e.g., shuttles, paratransit services, and private sector transit solutions), bike sharing services, etc.

What is claimed is:

1. A method comprising:
communicatively coupling a computing device having at least one processor to a first user device via a communication network;
receiving, by the computing device from the first user device via the communication network, a notification of a critical event, and first vehicle information of a first vehicle associated with the critical event;
generating, by the computing device, a list of aspects corresponding to the critical event;
receiving, by the computing device from the first user device via the communication network, first additional information related to the critical event, the first additional information comprising first damage information related to the critical event and second vehicle information of a second vehicle associated with the critical event, wherein at least a portion of the first additional information received is a first natural language input associated with the critical event;
converting, by the computing device, the first natural language input to first natural language data;
analyzing, by the computing device, the first natural language data to identify portions of the first natural language data corresponding to the critical event;
mapping, by the computing device, one or more of the portions of the first natural language data to a first aspect from the list of aspects, wherein the first aspect is a damage-related aspect;
analyzing, by the computing device, the second vehicle information of the second vehicle to identify the second vehicle;
determining, by the computing device, a second user device associated with the second vehicle based upon identifying the second vehicle;
establishing, by the computing device via the communication network, communication with the second user device;
transmitting to the second user device, by the computing device via the communication network, a request for an input related to the critical event;
receiving, by the computing device via the communication network, second additional information from the second user device, the second additional information comprising second damage information related to the critical event, wherein at least a portion of the second additional information received is a second natural language input associated with the critical event;
converting, by the computing device, the second natural language input to second natural language data;
analyzing, by the computing device, the second natural language data to identify portions of the second natural language data corresponding to the critical event;
mapping, by the computing device, one or more of the portions of the second natural language data to the first aspect;
comparing, by the computing device, a portion of the first damage information that was mapped to the first aspect to a portion of the second damage information that was mapped to the first aspect;
generating, by the computing device, a response certainty score based on the comparison of the portion of the first damage information that was mapped to the first aspect and the portion of the second damage information that was mapped to the first aspect;
determining, by the computing device, that the response certainty score satisfies a confidence value threshold; and
determining, by the computing device, a fault assessment for the critical event.

2. The method of claim 1, wherein the first additional information or the second additional information comprises multimedia content associated with the critical event;
wherein the method further comprises:
converting, by the computing device, the multimedia content to image data associated with the critical event;
performing, by the computing device, analysis of the image data; and
identifying, by the computing device and based on the analysis, that the image data corresponds to the first aspect;
wherein comparing, by the computing device, the portion of the first damage information that was mapped to the first aspect to the portion of the second damage information that was mapped to the first aspect comprises comparing, by the computing device, the portion of the first damage information that was mapped to the first aspect to the portion of the second damage information that was mapped to the first aspect and further to a portion of the image data; and
wherein generating, by the computing device, the response certainty score based on the comparison of the portion of the first damage information that was mapped to the first aspect and the portion of the second damage information that was mapped to the first aspect comprises generating, by the computing device, the response certainty score based on the comparison of the portion of the first damage information that was mapped to the first aspect, the portion of the second damage information that was mapped to the first aspect, and the portion of the image data.

3. The method of claim 2, wherein identifying, by the computing device and based on the analysis, that the image data corresponds to the first aspect comprises identifying, by the computing device and based on the analysis, a value that corresponds to the first aspect, for the image data.

4. The method of claim 1, wherein determining, by the computing device, the fault assessment for the critical event comprises determining, by the computing device and using one or more machine learning models, the fault assessment for the critical event.

5. A system comprising a computing device comprising:
one or more processors; and
a memory storing computer-executable instructions that, when executed by the one or more processors, cause the computing device to:
communicatively couple to a first user device via a communication network, the first user device configured to generate a user interface;
receive, from the first user device via the communication network, a notification of a critical event, and first vehicle information of a first vehicle associated with the critical event;
generate a list of aspects corresponding to the critical event;
receive, from the first user device, first additional information related to the critical event, the first additional information comprising first damage information related to the critical event and second vehicle information of a second vehicle associated with the critical event, wherein at least a portion of the first additional information received is a first natural language input associated with the critical event;
convert the first natural language input to first natural language data;
analyze the first natural language data to identify portions of the first natural language data corresponding to the critical event;
map one or more of the portions of the first natural language data to a first aspect from the list of aspects, wherein the first aspect is a damage-related aspect;
analyze the second vehicle information of the second vehicle to identify the second vehicle;
identify a second user device associated with the second vehicle based upon identifying the second vehicle;
establish, via the communication network, communication with the second user device;
transmit, to the second user device via the communication network, a request for an input related to the critical event;
receive, via the communication network, second additional information from the second user device, the second additional information comprising second damage information related to the critical event, wherein at least a portion of the second additional information received is a second natural language input associated with the critical event;
convert the second natural language input to second natural language data;
analyze the second natural language data to identify portions of the second natural language data corresponding to the critical event;
map one or more of the portions of the second natural language data to the first aspect;
compare a portion of the first damage information that was mapped to the first aspect to a portion of the second damage information that was mapped to the first aspect;
generate a response certainty score based on the comparison of the portion of the first damage information that was mapped to the first aspect and the portion of the second damage information that was mapped to the first aspect;
determine that the response certainty score satisfies a confidence value threshold; and
determine a fault assessment for the critical event.

6. The system of claim 5, wherein the first additional information or the second additional information comprises multimedia content associated with the critical event;
wherein the computer-executable instructions, when executed by the one or more processors, further cause the computing device to:
convert the multimedia content to image data associated with the critical event;
perform analysis of the image data; and
identify, based on the analysis, that the image data corresponds to the first aspect;
wherein, to compare the portion of the first damage information that was mapped to the first aspect to the portion of the second damage information that was mapped to the first aspect, the computer-executable instructions, when executed by the one or more processors, further cause the computing device to compare the portion of the first damage information that was mapped to the first aspect to the portion of the second damage information that was mapped to the first aspect and further to a portion of the image data; and
wherein, to generate the response certainty score based on the comparison of the portion of the first damage information that was mapped to the first aspect and the portion of the second damage information that was mapped to the first aspect, the computer-executable instructions, when executed by the one or more processors, further cause the computing device to generate the response certainty score based on the comparison of the portion of the first damage information that was mapped to the first aspect, the portion of the second damage information that was mapped to the first aspect, and the portion of the image data.

7. The system of claim 6, wherein, to identify, based on the analysis, that the image data corresponds to the first aspect, the computer-executable instructions, when executed by the one or more processors, further cause the computing device to identify, based on the analysis, a value that corresponds to the first aspect, for the image data.

8. The system of claim 5, wherein, to determine the fault assessment for the critical event, the computer-executable instructions, when executed by the one or more processors, further cause the computing device to determine, using one or more machine learning models, the fault assessment for the critical event.

9. One or more non-transitory media storing instructions that, when executed by one or more processors, cause the one or more processors to perform steps comprising:
communicatively coupling a computing device having at least one processor to a first user device via a communication network, the first user device configured to generate a user interface;
receiving, by the computing device from the first user device via the communication network, a notification of a critical event, and first vehicle information of a first vehicle associated with the critical event;
generating, by the computing device, a list of aspects corresponding to the critical event;

receiving, by the computing device from the first user device via the communication network, first additional information related to the critical event, the first additional information comprising first damage information related to the critical event and second vehicle information of a second vehicle associated with the critical event, wherein at least a portion of the first additional information received is a first natural language input associated with the critical event;

converting, by the computing device, the first natural language input to first natural language data;

analyzing, by the computing device, the first natural language data to identify portions of the first natural language data corresponding to the critical event;

mapping, by the computing device, one or more of the portions of the first natural language data to a first aspect from the list of aspects, wherein the first aspect is a damage-related aspect;

analyzing, by the computing device, the second vehicle information of the second vehicle to identify the second vehicle;

identifying, by the computing device, a second user device associated with the second vehicle based upon identifying the second vehicle;

establishing, by the computing device via the communication network, communication with the second user device;

transmitting, by the computing device to the second user device via the communication network, a request for an input related to the critical event;

receiving, by the computing device via the communication network, second additional information from the second user device, the second additional information comprising second damage information related to the critical event, wherein at least a portion of the second additional information received is a second natural language input associated with the critical event;

converting, by the computing device, the second natural language input to second natural language data;

analyzing, by the computing device, the second natural language data to identify portions of the second natural language data corresponding to the critical event;

mapping, by the computing device, one or more of the portions of the second natural language data to the first aspect;

comparing, by the computing device, a portion of the first damage information that was mapped to the first aspect to a portion of the second damage information that was mapped to the first aspect;

generating, by the computing device, a response certainty score based on the comparison of the portion of the first damage information that was mapped to the first aspect and the portion of the second damage information that was mapped to the first aspect;

determining, by the computing device, that the response certainty score satisfies a confidence value threshold; and determining, by the computing device, a fault assessment for the critical event.

10. The one or more non-transitory media of claim 9, wherein the first additional information or the second additional information comprises multimedia content associated with the critical event;

wherein the instructions, when executed by the one or more processors, cause the one or more processors to perform steps comprising:

converting, by the computing device, the multimedia content to image data associated with the critical event;

performing, by the computing device, analysis of the image data; and identifying, by the computing device and based on the analysis, that the image data corresponds to the first aspect;

wherein comparing, by the computing device, the portion of the first damage information that was mapped to the first aspect to the portion of the second damage information that was mapped to the first aspect comprises comparing, by the computing device, the portion of the first damage information that was mapped to the first aspect to the portion of the second damage information that was mapped to the first aspect and further to a portion of the image data; and wherein generating, by the computing device, the response certainty score based on the comparison of the portion of the first damage information that was mapped to the first aspect and the portion of the second damage information that was mapped to the first aspect comprises generating, by the computing device, the response certainty score based on the comparison of the portion of the first damage information that was mapped to the first aspect, the portion of the second damage information that was mapped to the first aspect, and the portion of the image data.

11. The one or more non-transitory media of claim 10, wherein identifying, by the computing device and based on the analysis, that the image data corresponds to the first aspect comprises identifying, by the computing device and based on the analysis, a value that corresponds to the first aspect, for the image data.

12. The one or more non-transitory media of claim 9, wherein determining, by the computing device, the fault assessment for the critical event comprises determining, by the computing device and using one or more machine learning models, the fault assessment for the critical event.

* * * * *